United States Patent
Hirai et al.

(10) Patent No.: US 9,626,750 B2
(45) Date of Patent: Apr. 18, 2017

(54) IMAGE PROCESSING METHOD FOR A COMPOSITE IMAGE AND IMAGE PROCESSING DEVICE, IMAGE PROCESSING PROGRAM, AND RECORDING MEDIUM THEREFOR

(75) Inventors: Yoshihito Hirai, Tokyo (JP); Takeshi Miura, Tokyo (JP)

(73) Assignee: MORPHO, INC., Tokyo (JP)

( * ) Notice: Subject to any disclaimer, the term of this patent is extended or adjusted under 35 U.S.C. 154(b) by 0 days.

(21) Appl. No.: 14/114,786

(22) PCT Filed: Aug. 31, 2012

(86) PCT No.: PCT/JP2012/072242
§ 371 (c)(1),
(2), (4) Date: Nov. 20, 2013

(87) PCT Pub. No.: WO2013/054607
PCT Pub. Date: Apr. 18, 2013

(65) Prior Publication Data
US 2014/0079333 A1    Mar. 20, 2014

(30) Foreign Application Priority Data

Oct. 14, 2011  (WO) .................. PCT/JP2011/073713

(51) Int. Cl.
*G06K 9/40* (2006.01)
*G06T 5/50* (2006.01)
(Continued)

(52) U.S. Cl.
CPC ................ *G06T 5/50* (2013.01); *G06T 5/003* (2013.01); *G06T 5/007* (2013.01); *H04N 5/2356* (2013.01);
(Continued)

(58) Field of Classification Search
None
See application file for complete search history.

(56) References Cited

U.S. PATENT DOCUMENTS 6,370,270 B1 *  4/2002  Nair .................... G06K 9/6203
                                                    382/209
7,463,296 B2   12/2008  Sun et al.
(Continued)

FOREIGN PATENT DOCUMENTS

EP       2175635 A1    4/2010
JP       10-191136 A   7/1998
(Continued)

OTHER PUBLICATIONS

International Search Report for PCT/JP2011/073713 dated Jan. 17, 2012.
(Continued)

*Primary Examiner* — Feng Niu
(74) *Attorney, Agent, or Firm* — Sughrue Mion, PLLC

(57) ABSTRACT

An image processing device that performs image processing on a composite image obtained by merging a first image and a second image having different exposure conditions. A data acquiring unit acquires the composite image and region data indicating a target region of the composite image. A image processing unit performs different image processes between the target region and a region other than the target region based on the region data. The images include a region on which a moving subject is rendered. In the region on which the moving subject is rendered, the composite image is generated by using a pixel value of one of the first image and the second image. The region data represents one or a plurality of regions generated based on the region of the composite image, on which the moving subject is rendered, as the target region.

10 Claims, 27 Drawing Sheets

(51) Int. Cl.
  *H04N 5/232* (2006.01)
  *H04N 5/235* (2006.01)
  *G06T 5/00* (2006.01)

(52) U.S. Cl.
  CPC ............... *H04N 5/23235* (2013.01); *G06T 2207/10144* (2013.01); *G06T 2207/20208* (2013.01); *H04N 5/23248* (2013.01)

(56) References Cited

U.S. PATENT DOCUMENTS

| | | | |
|---|---|---|---|
| 7,492,375 B2 | 2/2009 | Toyama et al. | |
| 7,835,439 B2* | 11/2010 | Witt | G06F 17/30017 375/240.13 |
| 8,437,508 B2* | 5/2013 | Akisada | G06K 9/00771 382/107 |
| 8,655,098 B2* | 2/2014 | On | G06T 5/009 382/274 |
| 9,058,640 B2* | 6/2015 | Manabe | G06T 5/00 |
| 2001/0041009 A1* | 11/2001 | Lee | G06K 9/209 382/218 |
| 2005/0117799 A1* | 6/2005 | Fuh et al. | 382/169 |
| 2006/0045336 A1* | 3/2006 | Lim | G06T 7/0083 382/173 |
| 2007/0044128 A1* | 2/2007 | Witt | G06F 17/30017 725/90 |
| 2008/0304706 A1* | 12/2008 | Akisada | G06K 9/00771 382/103 |
| 2009/0207258 A1 | 8/2009 | Jang et al. | |
| 2009/0284618 A1* | 11/2009 | Kurahashi | H04N 5/235 348/229.1 |
| 2010/0091119 A1* | 4/2010 | Lee | 348/208.4 |
| 2010/0157078 A1* | 6/2010 | Atanassov | G06T 5/007 348/222.1 |
| 2010/0253546 A1* | 10/2010 | Ibrahim | G08G 5/0008 340/961 |
| 2011/0150357 A1 | 6/2011 | Prentice | |
| 2011/0188744 A1 | 8/2011 | Sun | |
| 2012/0038793 A1 | 2/2012 | Shimizu et al. | |
| 2012/0218442 A1 | 8/2012 | Jandhyala et al. | |
| 2013/0051700 A1 | 2/2013 | Jo | |
| 2014/0313369 A1 | 10/2014 | Kageyama et al. | |

FOREIGN PATENT DOCUMENTS

| | | |
|---|---|---|
| JP | 3110797 B2 | 11/2000 |
| JP | 2002-190983 A | 7/2002 |
| JP | 2005-65119 A | 3/2005 |
| JP | 2005-130054 A | 5/2005 |
| JP | 2006148550 A | 6/2006 |
| JP | 2007-221423 A | 8/2007 |
| JP | 2008289120 A | 11/2008 |
| JP | 2008-301043 A | 12/2008 |
| JP | 2010-045510 A | 2/2010 |
| JP | 2010-258885 A | 11/2010 |
| JP | 4638361 B2 | 2/2011 |
| JP | 2011-171842 A | 9/2011 |
| JP | 2011-188277 A | 9/2011 |
| JP | 2013-102554 A | 5/2013 |
| KR | 10-2010-0040651 A | 4/2010 |

OTHER PUBLICATIONS

International Search Report for PCT/JP2012/072242 dated Oct. 9, 2012.
International Preliminary Report on Patentability in International Application No. PCT/JP2012/072242 mailed Apr. 24, 2014.
Office Action issued by Japanese Patent Office in Japanese Patent Application No. 2013-175399 mailed Apr. 15, 2014.
International Preliminary Report on Patentability in International Application No. PCT/JP2011/073713 mailed Apr. 24, 2014.
Heikkila et al, "A Texture-Based Method for Modeling the Background and Detecting Moving Objects", IEEE Transactions on Pattern Analysis and Machine Intelligence, IEEE Computer Society, vol. 28, No. 4, Apr. 1, 2006, pp. 657-662, XP001523373.
Zhu et al, "Real-time Ghost Removal for Composing High Dynamic Range Images," Industrial Electronics and Applications(ICIEA), Jun. 15, 2010, pp. 1627-1631, XP031711571.
Communication dated Mar. 9, 2015 from the European Patent Office in counterpart application No. 11874110.7.
Communication dated Feb. 10, 2015, from the Japanese Patent Office in counterpart application No. 2013-538473.
Communication from the United States Patent and Trademark Office issued Feb. 20, 2015 in U.S. Appl. No. 13/824,889.
Communication dated Jul. 3, 2015 from the State Intellectual Property Office of the P.R.C. in counterpart application No. 201180004309.2.
Sidibe, et al. "Ghost Detection and Removal in High Dynamic Range Images", EUSIPCO, 2009, pp. 1-5, XP055101428, Glasgow, United Kingdom.
Communication dated Sep. 14, 2015 from the European Patent Office issued in corresponding application No. 12840445.6.
Communication dated Aug. 18, 2015 from the Korean Intellectual Property Office in counterpart application No. 10-2014-7012928.

* cited by examiner (A)

(B)

(A)

(B)

(A)

(B)

(A)

(B)

(A)

(B)

(A)

(B)

(A)

(B)

(A)

(B)

(A)

(B)

Z2

IMAGE PROCESSING METHOD FOR A COMPOSITE IMAGE AND IMAGE PROCESSING DEVICE, IMAGE PROCESSING PROGRAM, AND RECORDING MEDIUM THEREFOR

CROSS REFERENCE TO RELATED APPLICATIONS

This is a National Stage of International Application No. PCT/JP2012/072242 filed Aug. 31, 2012, claiming priority based on International Application No. PCT/JP2011/073713 filed Oct. 14, 2011, the contents of all of which are incorporated herein by reference in their entirety.

TECHNICAL FIELD

The present invention relates to an image processing device, an image processing method, an image processing program, and a recording medium.

BACKGROUND ART

Conventionally, an image processing device that performs High Dynamic Range (HDR) composition is known (see Patent Literature 1). This device enlarges an apparent dynamic range of a video signal by merging a plurality of images generated sequentially under different exposure conditions. As a result, "whiteout" or "blackout" (a portion with an excessively high or low luminance level) that is created under a backlit situation is resolved. In addition, the device performs HDR composition after respectively transforming coordinates of a plurality of images in correspondence with imaging misalignments over time of the plurality of images caused by camera shake. Specifically, HDR composition is performed based on motion information of an image using a common area portion of two images. As a result, a misalignment (screen blur) of a screen (imaging device) with respect to a subject is resolved.

On the other hand, when a subject itself is moving, the problem of the so-called a subject blur that an object is divided into a plurality of parts on a composite image may occur. For this reason, a device that changes the output time of a readout signal or controls the number of exposure times, an exposure period, or a signal readout speed of an imaging device is known (see Patent Literature 2 and 3).

CITATION LIST

Patent Literature

Patent Literature 1: Japanese Patent No. 3110797
Patent Literature 2: Japanese Patent Application Publication No. 2005-130054
Patent Literature 3: Japanese Patent Application Publication No. 2005-065119

SUMMARY OF INVENTION

Technical Problem

Since the devices disclosed in Patent Literature 2 and 3 reduce the subject blur by controlling the imaging conditions, it is necessary to change the operation or the setting of the apparatus according to the presence of a subject, which may complicate the control process.

For this reason, it is desirable to perform HDR composition that can reduce a subject blur by using the image information of the input image only. However, since the HDR image is obtained through various image processing, the influence of the processing during the HDR composition becomes significant in the subsequent steps such as a tone mapping process, and it may be difficult to obtain a high quality image. Due to this, it is desirable to provide an image processing device, an image processing method, an image processing program, and a recording medium storing the image processing program capable of performing the subsequent steps appropriately even when HDR composition with subject blur suppression is performed by using the image information of the input image only.

Solution to Problem

That is, an image processing device according to one aspect of the present invention is an image processing device that performs image processing on a composite image obtained by merging a first image and a second image having different exposure conditions. This device includes a data acquiring unit and an image processing unit. The data acquiring unit acquires the composite image and region data indicating a target region of the composite image. The image processing unit performs different image processes between the target region and a region other than the target region based on the region data. Here, the first image and the second image include a region on which a moving subject is rendered. In the region on which the moving subject is rendered, the composite image is generated by using a pixel value of one of the first image and the second image. The region data represents one or a plurality of regions generated based on the region of the composite image, on which the moving subject is rendered, as the target region.

In this image processing device, when image processing is performed on the composite image, different processes are performed between the region on which the moving subject is rendered and the other regions using the region data. During the merging process, various image processes are performed on the region on which the moving subject is captured. Due to this, by performing different image processes between the region on which the moving subject is captured and the other region rather than performing the same image processing on the entire image, it is possible to obviate the influence of the processing during merging from becoming significant in the subsequent steps. Thus, even when merging with subject blur suppression is performed using the image information of the input image only, it is possible to perform the subsequent steps appropriately.

In one embodiment, the image processing device may further include an input unit, a likelihood calculating unit, and a region data generating unit. The input unit inputs the first image and the second image. The likelihood calculating unit calculates a subject motion likelihood at each pixel based on a difference between the first image and the second image. The region data generating unit generates the region data based on the subject motion likelihood. With this configuration, it is possible to generate the region data from the input images.

In one embodiment, the image processing device may further include an exposure estimating unit and a merging unit. The exposure estimating unit estimates an exposure transform function for conforming the exposure conditions of the first image and the second image based on the subject motion likelihood. The merging unit merges the first image and the second image by using the exposure transform function. In this manner, since the likelihood of the motion of the subject is taken into consideration when exposure levels are matched, it is possible to match the exposure levels by excluding a region where the color is likely to change due to a motion of the subject, for example. Therefore, it is possible to generate a composite image appropriately.

In one embodiment, the image processing device may further include a recording unit that records the composite image and the region data so as to associate with each other. With this configuration, it is possible to appropriately perform the subsequent steps at a desired timing as well as during capturing or merging.

In one embodiment, the region data may be data having a size smaller than a size of the first image, the second image, or the composite image. With this configuration, it is possible to reduce the data amount associated with the composite image.

In one embodiment, the region data may be further associated with original pixel information that specifies pixel information of an image used when the target region represented by the region data is merged, the data acquiring unit may acquire the original pixel information associated with the region data, and the image processing unit may perform different processes between the target region and the region other than the target region based on the region data and the original pixel information.

With this configuration, it is possible to determine whether the target region is merged using a whiteout image region or the target region is merged using a blackout image region (or a dark region in which pixel information is not sufficient). Thus, it is possible to perform the subsequent steps more appropriately by changing the process according to the original pixel information.

In one embodiment, the image processing unit may perform different tone mapping processes between the target region and the region other than the target region. In this manner, by performing different tone mapping processes in the respective regions, it is possible to obviate big amount of noise from being generated in the target region and to obviate the color of the target region from becoming unnatural.

An image processing method according to another aspect of the present invention is an image processing method of performing image processing on a composite image obtained by merging a first image and a second image having different exposure conditions. This method includes a data acquiring step and an image processing step. The data acquiring step involves acquiring the composite image and region data indicating a target region of the composite image. The image processing step involves performing different image processes between the target region and a region other than the target region based on the region data. Here, the first image and the second image include a region on which a moving subject is rendered. In the region on which the moving subject is rendered, the composite image is generated by using a pixel value of one of the first image and the second image. The region data represents one or a plurality of regions generated based on the region of the composite image, on which the moving subject is rendered, as the target region.

An image processing program according to still another aspect of the present invention is an image processing program for causing a computer to perform image processing on a composite image obtained by merging a first image and a second image having different exposure conditions. The program causes the computer to operate as a data acquiring unit and an image processing unit. The data acquiring unit acquires the composite image and region data indicating a target region of the composite image. The image processing unit performs different image processes between the target region and a region other than the target region based on the region data. Here, the first image and the second image include a region on which a moving subject is rendered. In the region on which the moving subject is rendered, the composite image is generated by using a pixel value of one of the first image and the second image. The region data represents one or a plurality of regions generated based on the region of the composite image, on which the moving subject is rendered, as the target region.

A recording medium according to still another aspect of the present invention is a recording medium that records an information processing program for causing a computer to perform image processing on a composite image obtained by merging a first image and a second image having different exposure conditions. The program causes the computer to operate as a data acquiring unit and an image processing unit. The data acquiring unit acquires the composite image and region data indicating a target region of the composite image. The image processing unit performs different image processes between the target region and a region other than the target region based on the region data. Here, the first image and the second image include a region on which a moving subject is rendered. In the region on which the moving subject is rendered, the composite image is generated by using a pixel value of one of the first image and the second image. The region data represents one or a plurality of regions generated based on the region of the composite image, on which the moving subject is rendered, as the target region.

According to the image processing method, the image processing program, and the recording medium according to the other aspects of the present invention, the same advantageous effects as the image processing device described above are obtained.

Advantageous Effects of Invention

According to various aspects and embodiments of the present invention, an image processing device, an image processing method, an image processing program, and a recording medium storing the image processing program capable of performing the subsequent steps appropriately even when HDR composition with subject blur suppression is performed using the image information of the input image only are provided.

BRIEF DESCRIPTION OF DRAWINGS

FIG. 11 is a schematic diagram explaining a merging mask, in which FIG. 11(A) is a graph showing examples of an exposure transform function, and FIG. 11(B) is a graph showing an example of weighting when splicing exposure transform functions together;

FIG. 12 is a schematic diagram explaining a luminance base mask, in which FIG. 12(A) is an example of an input image, and FIG. 12(B) is an example of a luminance base mask;

FIG. 13 is a schematic diagram explaining labeling of a subject blur region of a difference image, in which FIG. 13(A) is an example of a difference image, and FIG. 13(B) is an example of a labeled difference image;

FIG. 20 illustrates an input image in which a moving subject is captured and illustrates an example of an input image including a blackout region, in which FIG. 20(A) and FIG. 20(B) illustrate images captured under different exposure conditions;

FIG. 21 illustrates a first comparative example in which a tone mapping process is performed on an entire HDR image generated from two input images illustrated in FIG. 20, in which FIG. 21(A) illustrates an image after the tone mapping process and FIG. 21(B) illustrates an image for describing a moving subject region in FIG. 21(A);

FIG. 23 illustrates a first practical example in which a tone mapping process is performed on a HDR image generated from two input images illustrated in FIG. 20 and a noise reduction filter is applied to a moving subject region, in which FIG. 23(A) illustrates an image to which a noise reduction filter is applied and FIG. 23(B) illustrates an image for describing a moving subject region in FIG. 23(A);

FIG. 25 illustrates an input image in which a moving subject is captured and illustrates an example of an input image including a whiteout region, in which FIG. 25(A) and FIG. 25(B) illustrate images captured under different exposure conditions;

FIG. 26 illustrates a second comparative example in which a tone mapping process is performed on an entire HDR image generated from two input images illustrated in FIG. 25, in which FIG. 26(A) illustrates an image after the tone mapping process and FIG. 26(B) illustrates an image for describing a moving subject region in FIG. 26(A); and FIG. 27 illustrates the second practical example in which a different tone mapping process is performed on respective regions of the HDR image generated from two input images illustrated in FIG. 25, in which FIG. 27(A) illustrates an image in which a different tone mapping process is performed on respective regions and FIG. 27(B) illustrates an image for describing a moving subject region in FIG. 27(A).

DESCRIPTION OF EMBODIMENTS

Figure 1:
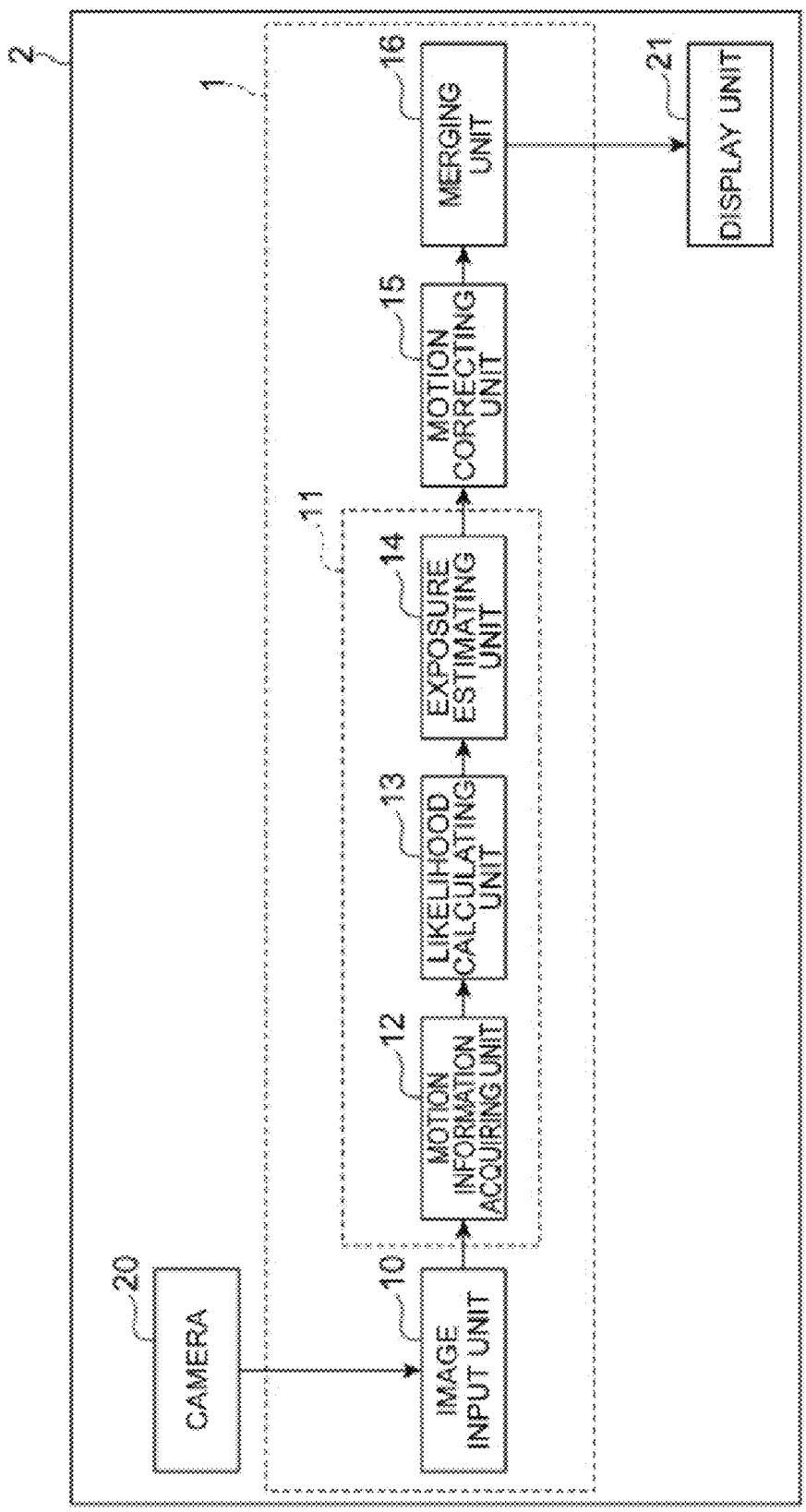
FIG. 1 is a functional block diagram of a mobile terminal mounted with an image processing device according to an embodiment.

Hereinafter, an embodiment of the present invention will be described with reference to the accompanying drawings. In the drawings, the same or comparable portions are assigned with the same reference characters and redundant descriptions are omitted.

(First Embodiment)

An image processing device according to the present embodiment is an device that merges a plurality of images under different exposure conditions to generate a single composite image. For example, this image processing device is adopted when performing HDR composition in which a plurality of images sequentially generated under different exposure conditions are merged in order to enlarge an apparent dynamic range of a video signal. The image processing device according to the present embodiment is favorably mounted to, for example, a mobile terminal with limited resources such as a mobile phone, a digital camera, and a PDA (Personal Digital Assistant). However, the image processing device is not limited thereto and may be mounted to, for example, an ordinary computer system. Hereinafter, in consideration of ease of description and understanding, an image processing device mounted to a mobile terminal equipped with a camera function will be described as an example of the image processing device according to the present invention.

Figure 2:
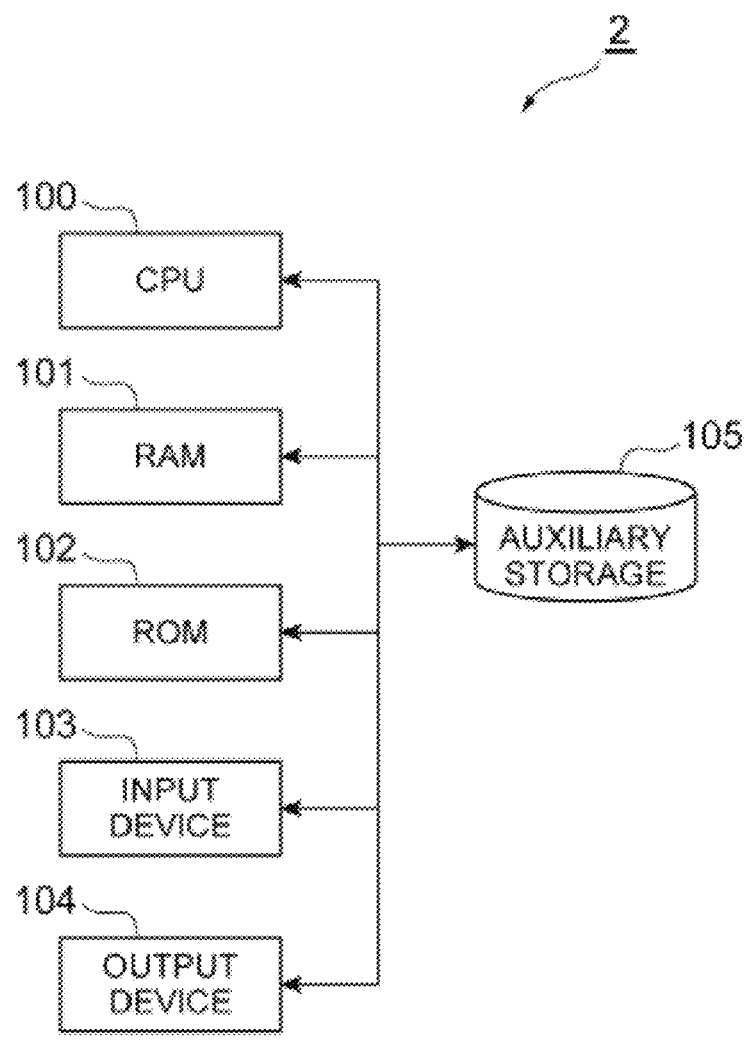
FIG. 2 is a hardware configuration diagram of a mobile terminal mounted with the image processing device shown in FIG. 1.

FIG. 1 is a functional block diagram of a mobile terminal 2 mounted with an image processing device 1 according to the present embodiment. For example, the mobile terminal 2 shown in FIG. 1 is a mobile terminal that is carried around by a user and has a hardware configuration shown in FIG. 2. FIG. 2 is a hardware configuration diagram of the mobile terminal 2. As shown in FIG. 2, the mobile terminal 2 is physically constructed as an ordinary computer system comprising a CPU (Central Processing Unit) 100, a main storage such as a ROM (Read Only Memory) 101 and a RAM (Random Access Memory) 102, an input device 103 such as a camera or a keyboard, an output device 104 such as a display, an auxiliary storage 105 such as a hard disk, and the like. Respective functions (to be described later) of the mobile terminal 2 and the image processing device 1 are realized by loading predetermined computer software onto hardware such as the CPU 100, the ROM 101, the RAM 102, or the like, and by having the CPU 100 control operations of the input device 103 and the output device 104 and control reading data from and writing data to the main storage or the auxiliary storage 105. While a hardware configuration of the mobile terminal 2 has been described above, alternatively, the image processing device 1 may be configured as an ordinary computer system comprising the CPU 100, a main storage such as the ROM 101 and the RAM 102, the input device 103, the output device 104, the auxiliary storage 105, and the like. Moreover, the mobile terminal 2 may comprise a communication module or the like.

As shown in FIG. 1, the mobile terminal 2 comprises a camera 20, the image processing device 1, and a display unit 21. The camera 20 has a function of generating an image. For example, a pixel sensor such as a CMOS is used as the camera 20. For example, the camera 20 has a continuous generating function of generating an image for repetitively performing generating at predetermined intervals from a timing specified by a user operation or the like. In other words, the camera 20 functions to acquire not only a single still image but also a plurality of still images as a group (successive frame images). In addition, the camera 20 functions to perform generating while modifying an exposure condition of each of the successive frame images. In other words, each of the images successively generated by the camera 20 has a different exposure condition. For example, the camera 20 functions to output a generated frame image to the image processing device 1 each time generation is performed.

The image processing device 1 comprises an image input unit 10, a preprocessing unit 11, a motion correcting unit 15, and a merging unit 16.

The image input unit 10 functions to input a frame image generated by the camera 20. For example, the image input unit 10 functions to input a frame image generated by the camera 20 each time generation is performed. In addition, the image input unit 10 functions to save an input frame image in a storage device comprising the mobile terminal 2.

The preprocessing unit 11 performs preprocessing prior to HDR composition. The preprocessing unit 11 comprises a motion information acquiring unit 12, a likelihood calculating unit 13, and an exposure estimating unit 14.

The motion information acquiring unit 12 functions to acquire motion information of a pixel between images. For example, supposing that a first image and a second image are input frame images, motion information of a pixel between the first image and the second image is acquired. For example, a motion vector is used as the motion information. In addition, when three or more input images are inputted from the image input unit 10, the motion information acquiring unit 12 may sort the input images in an order of exposure and acquire motion information between input images with close exposure conditions. By comparing images with close exposure conditions and detecting motion from the images, a decline in motion detection accuracy due to a difference in exposures between images can be avoided. Furthermore, the motion information acquiring unit 12 may select a reference image to which motion information is conformed from a plurality of input images. For example, an image having the largest number of effective pixels among the plurality of input images is adopted as the reference image. In this case, an effective pixel refers to a pixel that is not applicable either to "whiteout" or "blackout". "blackout" or a "whiteout" is determined based on a luminance value. Furthermore, when acquiring motion information using two input images, the motion information acquiring unit 12 may extract a feature point from the input image having higher exposure out of the two input images, and obtain a corresponding point of the feature point from the input image of lower exposure. By performing such an operation, a situation can be avoided in which motion information cannot be acquired due to a point extracted as a feature point in an image of low exposure suffering "whiteout" in an image of high exposure. Alternatively, motion information may be acquired from a gyro sensor or the like. The motion information acquiring unit 12 functions to output the motion information to the likelihood calculating unit 13.

The likelihood calculating unit 13 functions to calculate a likelihood of motion of a subject (a subject motion likelihood) at each pixel. When the subject motion likelihood is high, there is a high the possibility that the subject is in motion and becomes a blur region in a composite image. The likelihood calculating unit 13 corrects a screen motion between input images using motion information. Subsequently, the likelihood calculating unit 13 normalizes pixel values of corresponding pixels in the two input images. For example, the likelihood calculating unit 13 obtains Local Ternary Patterns (LTPs) based on pixel values of neighboring pixels. The three RGB colors are used as the pixel values and 24 pixels are used as the neighboring pixels. Subsequently, the likelihood calculating unit 13 calculates a subject motion likelihood using a difference between normalized images. For example, a difference of a normalized pixel value or, in other words, a mismatching rate of the sign at a pixel of interest according to LTP is calculated as the subject motion likelihood at the pixel of interest.

Alternatively, the likelihood calculating unit 13 may calculate a subject motion likelihood by obtaining multi-resolution of two input images. For example, by intergrading resolutions of the respective input images (a first image and a second image), the likelihood calculating unit 13 creates a plurality of images (a first processed image and a second processed image) of different resolutions. Subsequently, the likelihood calculating unit 13 creates a difference image between the first processed image and the second processed image at the same resolution. The difference image represents a difference between the first processed image and the second processed image and, more specifically, a difference in pixel values. The likelihood calculating unit 13 then calculates a subject motion likelihood at each pixel by weighting a difference image obtained per resolution. A mismatching rate of the sign at each pixel according to LTP is used as the weight (reliability). For example, the count of pairs having significant differences according to LTP is used. Alternatively, further weighting may be applied according to an image size or a resolution of the first processed image or the second processed image. In other words, when the image size is large or the resolution is the high, greater weight can be applied. The likelihood calculating unit 13 functions to output the subject motion likelihood at each pixel to the exposure estimating unit 14.

The exposure estimating unit 14 functions to estimate an exposure transform function for conforming exposure conditions between input images to each other. The exposure transform function is a function for transforming an exposure of each input image to an exposure comparable to that of a reference image. For example, the exposure transform function means a function that expresses a relation between pixel values of the corresponding pixels (positions) of images of the same scene captured under different exposure conditions. With a pixel value of a pixel being a parameter, another pixel value of a corresponding pixel can be calculated in use of the exposure transform function. When three or more input images are inputted, the exposure estimating unit 14 may conform exposure conditions of input images with close exposure conditions to each other. By comparing images with close exposure conditions and conforming exposures of the images to each other, a decline in estimation accuracy due to a difference in exposures between images can be avoided.

For example, the exposure estimating unit 14 corrects a motion between input images using motion information. Subsequently, the exposure estimating unit 14 samples luminance values from identical locations on the two motion-corrected input images as a set, and plots a relationship thereof. For example, a Halton sequence is used as coordinates of an input image. Moreover, the exposure estimating unit 14 does not need to adopt a luminance value that is equal to or higher than a predetermined value or a luminance value that is equal to or lower than a predetermined value as a sampling point. For example, luminance values within a range of 10 to 245 are adopted as sampling points. For example, the exposure estimating unit 14 estimates an exposure transform function by fitting the plot results. When $K_i$ denotes an original luminance value of a sampling point i on the first image, $f(K_i)$ denotes an exposure transform function, and $U_i$ denotes an original luminance value of the sampling point i on the second image, then fitting may be performed by the Gauss-Newton method using an error function e provided below.

$$e=\Sigma\{(f(K_i)-U_i)^2\} \quad (1)$$

Moreover, the exposure estimating unit 14 performs sampling for deriving the exposure transform function based on the subject motion likelihood at each pixel. For example, the exposure estimating unit 14 selects a sampling point based on a subject motion likelihood at each pixel. For example, the exposure estimating unit 14 provides several thresholds incrementally in stages and samples luminance values starting at a pixel with a low subject motion likelihood. Alternatively, the exposure estimating unit 14 may weight a sampling point based on the subject motion likelihood. For example, an error function e provided below may be minimized to be fitted.

$$e=\Sigma\{w_i \cdot (f(K_i)-U_i)^2\} \quad (2)$$

In Expression 2, $w_i$ denotes weight. The higher the subject motion likelihood of a pixel becomes, the smaller the weight $w_i$ set to the pixel. In this manner, by having the exposure estimating unit 14 calculate the exposure transform function based on the subject motion likelihood at each pixel, data of sampling points with lower reliabilities can be prevented from affecting the derivation of the exposure transform function. Moreover, the exposure transform function may be modified so that a transformed input image is kept in an expressible range.

The motion correcting unit 15 functions to correct motion between input images using motion information. The merging unit 16 uses a merging mask to merge input images with each other or to merge an image already merged with an input image. A merging mask is an image representation of a composition ratio (weight) when merging (alpha blending) images with each other. When there are three or more input images, the merging unit 16 first merges two input images according to the merging mask, and then generates a merging mask of the composite image and the remaining input image and performs the merging. The merging unit 16 combines a luminance base mask with a subject blur mask to generate a merging mask. A luminance base mask is a mask for preventing a "whiteout" region or a "blackout" region from being used for composition by determining weighting to be applied when merging images based on a luminance value. A subject blur mask is a mask for preventing an occurrence of a phenomenon (ghost phenomenon) in which a subject is displayed doubly or triply overlapped when merging an image of the subject in motion.

The merging unit 16 calculates a weight based on an original luminance value of an input image to generate a luminance base mask. For example, a weight is calculated according to the computation formula below.

$$f(x) = 1.0 \quad (x < A)$$
$$f(x) = \frac{B-x}{B-A} \quad (A <= x < B)$$
$$f(x) = 0.0 \quad (B <= x)$$

According to the computation formulae above, a weight is appropriately determined and discontinuity in luminance is reduced. Moreover, the merging mask may be subjected to feathering in order to reduce spatial discontinuity.

The merging unit 16 calculates a weight based on a difference between input images to generate a subject blur mask. The merging unit 16 calculates a subject motion likelihood from a difference in pixel values between input images. A difference between pixel values of input images and a subject motion likelihood can be obtained by operating in a similar manner to the likelihood calculating unit 13 described earlier. In addition, the likelihood calculating unit 13 detects subject blur regions in which pixels with a subject motion likelihood that is equal to or lower than a predetermined threshold are adjacent to each other, attaches an identification label to each subject blur region, and generates a subject blur mask for each subject blur region. Moreover, the predetermined threshold may be flexibly modified according to required specifications. Setting a large threshold makes it easier to extract a continuous region. By generating a mask for each subject blur region, a pixel can be selected for each subject blur region from an image with a large amount of information so as to avoid a "whiteout" region or a "blackout" region. In other words, as the subject blur mask, there are a lo_mask (first mask) that forces a pixel value with a low luminance value to be selected among images that are to be merged and a hi_mask (second mask) that forces a pixel value with a high luminance value to be selected among the images that are to be merged. Basically, the merging unit 16 generates the second mask that causes a pixel value to be selected from a high-exposure image having a large amount of information. However, when a subject blur region is affected by a "whiteout" region in the high-exposure image, the merging unit 16 generates the first mask. Specifically, the merging unit 16 generates the first mask when any of the following conditions is satisfied. A first condition is that, among two images to be merged, an area of "whiteout" in a high-exposure image is greater than an area of a "blackout" region in a low-exposure image. A second condition is that, in a high-exposure image among two images to be cmerged, an area of a "whiteout" region in a subject blur region is equal to or greater than 10% of the subject blur region. Moreover, a case in which a region adjacent to a subject blur region in a high-exposure image among two images to be merged is a "whiteout" region may be adopted as a condition.

The merging unit 16 combines a luminance base mask with a subject blur mask to generate a merging mask. For example, the merging unit 16 multiplies the luminance base mask by an inverted mask of the first mask. Alternatively, the merging unit 16 adds the second mask to the luminance base mask. The merging unit 16 merges all input images and outputs a final composite image to the display unit 21. The display unit 21 displays the composite image. For example, a display device is used as the display unit 21.

Figure 3:
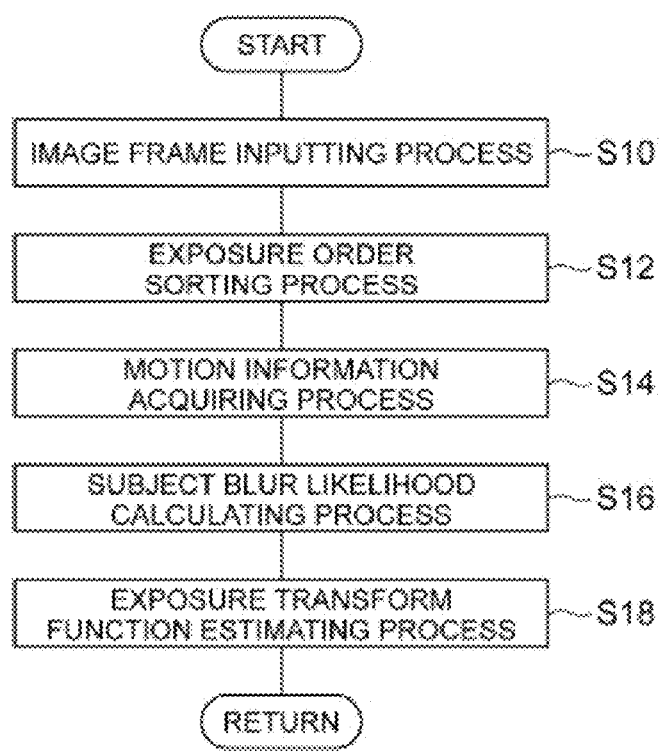
FIG. 3 is a flow chart showing a preprocessing operation of the image processing device shown in FIG. 1.

Next, operations of the image processing device 1 will be described. FIG. 3 is a flow chart for explaining preprocessing of HDR composition. For example, a control process shown in FIG. 3 starts when an HDR composition mode is selected by a user and the camera 20 successively generates a plurality of images.

First, the image input unit 10 inputs an image frame (S10). Hereinafter, in consideration of ease of description and understanding, it is assumed that five input images $I_0$ to $I_4$ have been inputted. Once the process of S10 is finished, a transition is made to an exposure order sorting process (S12).

In the process of S12, the motion information acquiring unit 12 sorts the input images $I_0$ to $I_4$ in an order of exposure. For example, the motion information acquiring unit 12 sorts the input images $I_0$ to $I_4$ using average values of luminance values. Here, it is assumed that when the number attached to the input images $I_0$ to $I_4$ becomes smaller, the luminance value thereof becomes lower. In this case, the input images $I_0$ to $I_4$ are sorted in the order of their numbers. Once the process of S12 is finished, a transition is made to a motion information acquiring process (S14).

Figure 4:
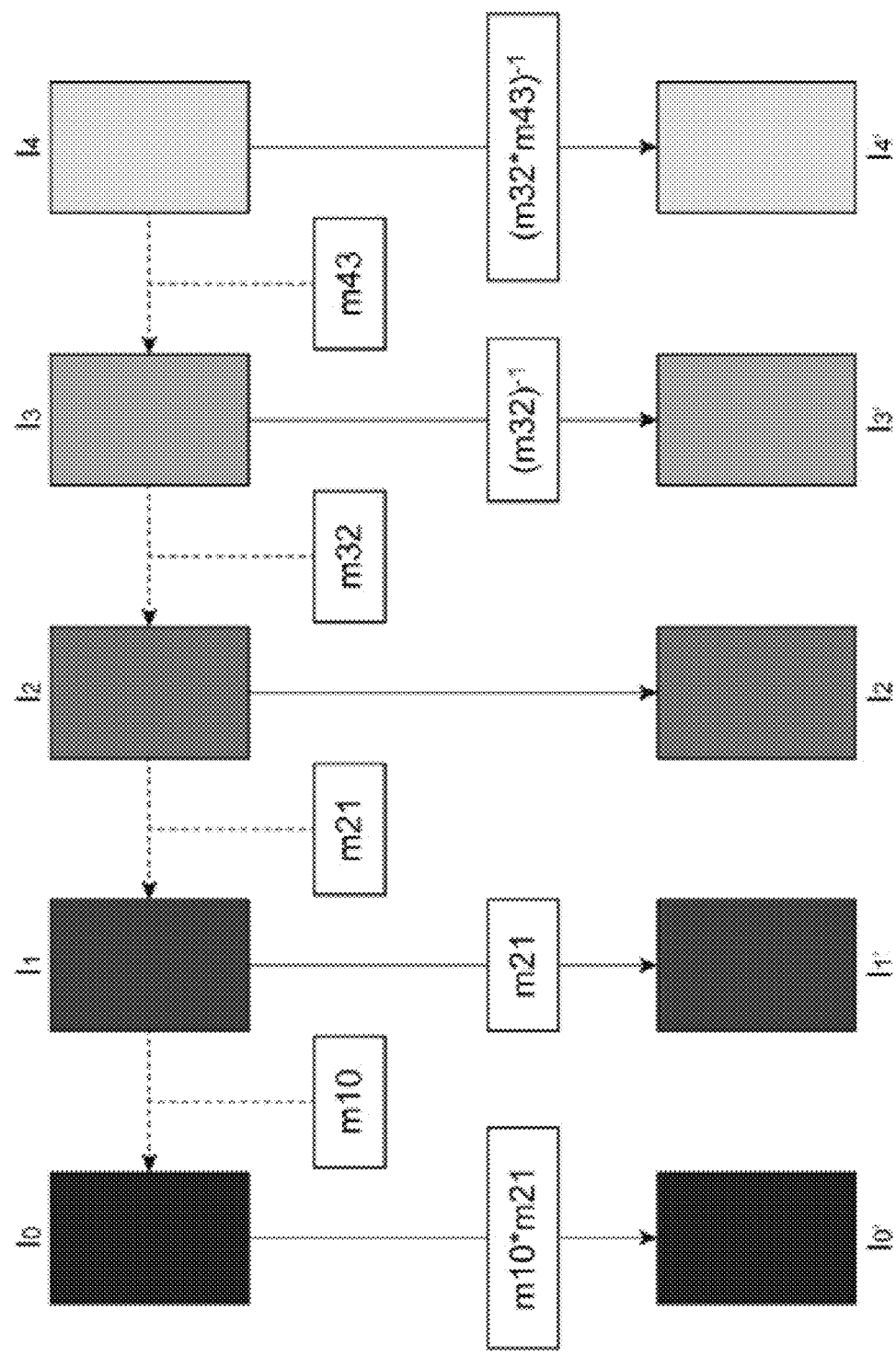
FIG. 4 is a schematic diagram explaining motion detection.

In the process of S14, the motion information acquiring unit 12 acquires motion information between the respective input images $I_0$ to $I_4$. FIG. 4 is a schematic diagram explaining a motion information acquiring process. As shown in FIG. 4, it is assumed that the input images $I_0$ to $I_4$ are arranged from left to right in an ascending order of average luminance values. First, the motion information acquiring unit 12 sets a reference image from among the input images $I_0$ to $I_4$. In this case, the input image $I_2$ is set as the reference image. Next, motion information of input images with close exposure conditions is acquired (for example, the input image $I_0$ and the input image $I_1$ or the input image $I_1$ and the input image $I_2$). The motion information acquiring unit 12 extracts a feature point from an input image having higher exposure between the two input images, and extracts a corresponding point of the extracted feature point from the input image having lower exposure. Due to the motion information, a transformation matrix can be obtained which transforms input images with close exposure conditions into coordinates of a same dimension. FIG. 4 shows transformation matrices m10, m21, m32, and m43 for conforming an image having lower exposure among the input images with close exposure conditions to an image having higher exposure. Next, using the transformation matrices m10, m21, m32, and m43, a transformation matrix is calculated which transforms coordinates of the input images $I_0$, $I_1$, $I_3$, and $I_4$ other than the reference image $I_2$ into coordinates corresponding to the reference image $I_2$. As shown in FIG. 4, a transformation matrix that transforms the input image $I_0$ into the reference image $I_2$ is m10*m21. A transformation matrix that transforms the input image $I_1$ into the reference image $I_2$ is m10. A transformation matrix that transforms the input image $I_3$ into the reference image $I_2$ is $(m32)^{-1}$. A transformation matrix that transforms the input image $I_4$ into the reference image $I_2$ is $(m32*m43)^{-1}$. Hereinafter, the input images after transformation will be denoted as $I_{0'}$ to $I_{4'}$. Once the process of S14 is finished, a transition is made to a subject motion likelihood calculating process (S16).

Figure 5:
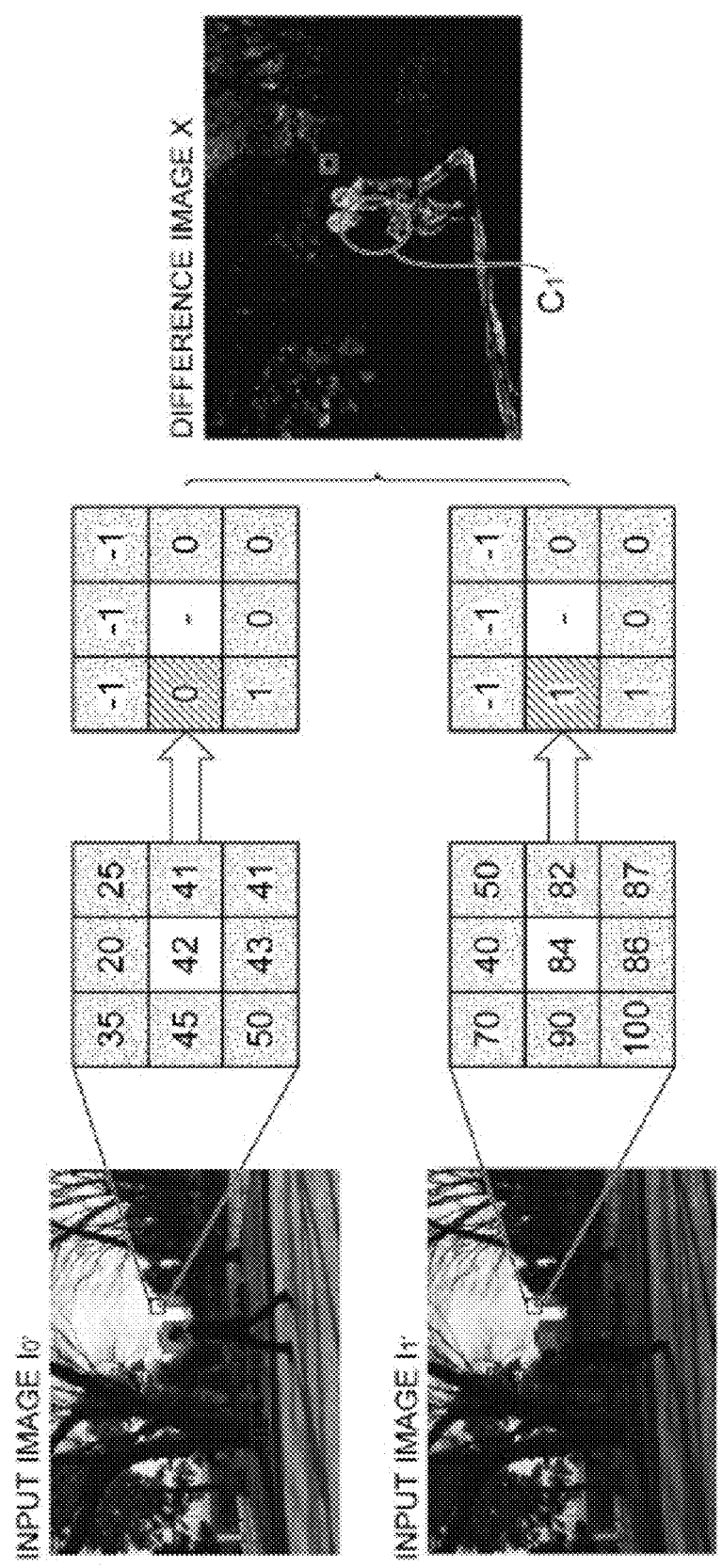
FIG. 5 is a schematic diagram explaining a difference image.

In the process of S16, the likelihood calculating unit 13 calculates a subject motion likelihood between the respective input images $I_{0'}$ to $I_{4'}$. FIG. 5 shows an example of calculating a subject motion likelihood between the input image $I_{0'}$ and the input image $I_{1'}$. Moreover, FIG. 5 shows a case in which an R value is used as a pixel value. As shown in FIG. 5, the likelihood calculating unit 13 acquires pixel values (R values) of eight neighboring pixels of a pixel of interest (R value=42) of the input image $I_{0'}$. Subsequently, normalization is performed using the pixel value of the pixel of interest and the pixel values of the eight neighboring pixels. For example, LTP is used. 0 is assumed when a difference between the pixel value of the pixel of interest and the pixel values of the eight neighboring pixels is within a range of ±5, 1 is assumed when greater than +5, and −1 is assumed when smaller than −5. The likelihood calculating unit 13 performs normalization on the input image $I_{1'}$ in a similar manner. In FIG. 5, normalization is performed on a pixel of the input image $I_{1'}$ corresponding to the pixel of interest of the input image $I_{0'}$. Next, a comparison of pixel values of normalized pixels reveals that a difference exists. A difference image X is an image representation in which a color of a pixel is varied from black to white according to a magnitude of a difference (mismatching rate of the sign). The difference image is an image representation of a subject motion likelihood at each pixel. The number of neighboring pixels need not be limited to eight and may be 24 instead. Furthermore, in addition to R values, G values and B values may be processed in a similar manner.

Figure 6:
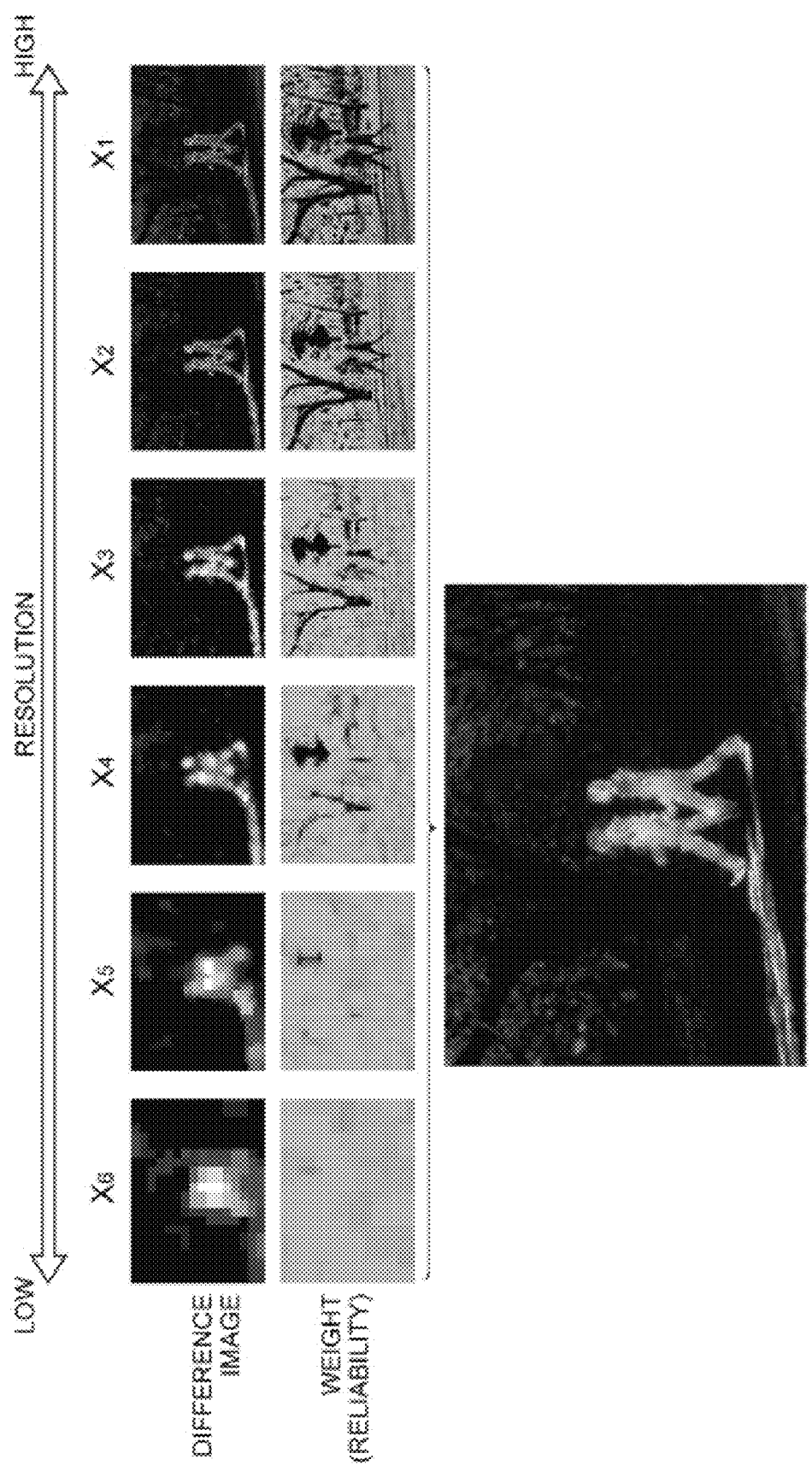
FIG. 6 is a schematic diagram explaining an example of deriving a difference image using multiresolution.

In order to improve accuracy of a subject motion likelihood of a smooth region denoted by a region $C_1$ in the difference image X, the likelihood calculating unit 13 may obtain a subject motion likelihood using multi-resolution of images. FIG. 6 shows an example of obtaining a subject motion likelihood using the multi-resolution of images. First, the likelihood calculating unit 13 generates a plurality of images that represent intergraded resolutions of the input image $I_{0'}$ and the input image $I_{1'}$. The likelihood calculating unit 13 then generates a difference image at the same resolution. The difference image simply represents a subtraction of pixel values. FIG. 6 shows a case in which the input image $I_{0'}$ and the input image $I_{1'}$ are multiplexed in six levels. $X_1$ to $X_6$ denote the respective difference images, in which when the number becomes larger, the resolution of the difference image becomes lower. In addition, when the resolution becomes lower, the image size becomes smaller. The difference images are weighted according to reliability to calculate a final difference image. As for reliability, for example, a product of the number of pairs having significant differences according to the LTP differences described earlier multiplied by an image size (or a resolution) is used. For example, in the case of LTP shown in FIG. 5, there is one pair having a significant difference. In this manner, the number of pairs is multiplied by an image size for each pixel to calculate a weight image (an image representation of weights) corresponding to the difference images $X_1$ to $X_6$. Subsequently, a final difference image is calculated using the difference images $X_1$ to $X_6$ and the weight image. The likelihood calculating unit 13 calculates difference images for the input images $I_{1'}$ to $I_{4'}$ according to a similar method as described above. Once the process of S16 is finished, a transition is made to an exposure transform function estimating process (S18).

Figure 7:
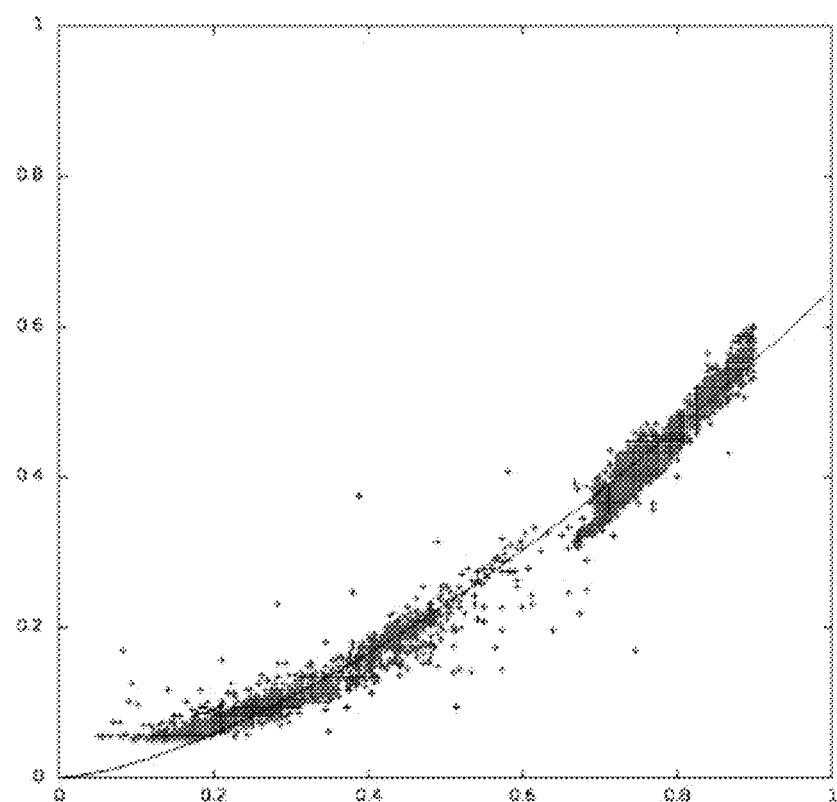
FIG. 7 is a graph showing an example of an exposure transform function.

In the process of S18, the exposure estimating unit 14 estimates an exposure transform function. With the exposure estimating unit 14, when x denotes a luminance value before transformation and y denotes a luminance value after transformation, then an exposure transform function can be expressed by the following expression.

$$y = a \cdot x^b$$

where (a, b) denotes an exposure transform parameter. The exposure transform function can be obtained by deriving the exposure transform parameter (a, b). Hereinafter, a case of obtaining an exposure transform function of the input image $I_{0'}$ and the input image $I_{1'}$ after motion correction will be described. At a point (x, y) in the input images, the exposure estimating unit 14 samples several sets of a luminance value of the input image $I_{0'}$ with low exposure and a luminance value of the input image $I_{1'}$ with low exposure, and plots a relationship thereof. In this case, the sampling points are selected based on the difference image acquired by the process of S16. For example, sampling is arranged so as not to be performed from a region with high subject motion likelihood. In other words, sampling is arranged so as to be performed from a region with low subject motion likelihood. In addition, for example, the higher the subject motion likelihood, the lower the weight assigned, and an exposure transform function is estimated using Expression 2. Accordingly, fitting such as that shown in FIG. 7 is performed. The likelihood calculating unit 13 estimates exposure transform functions between the input images $I_{1'}$ to $I_{4'}$ according to a similar method as described above. Moreover, data with luminance values close to 0 or 255 may be excluded.

Figure 8:
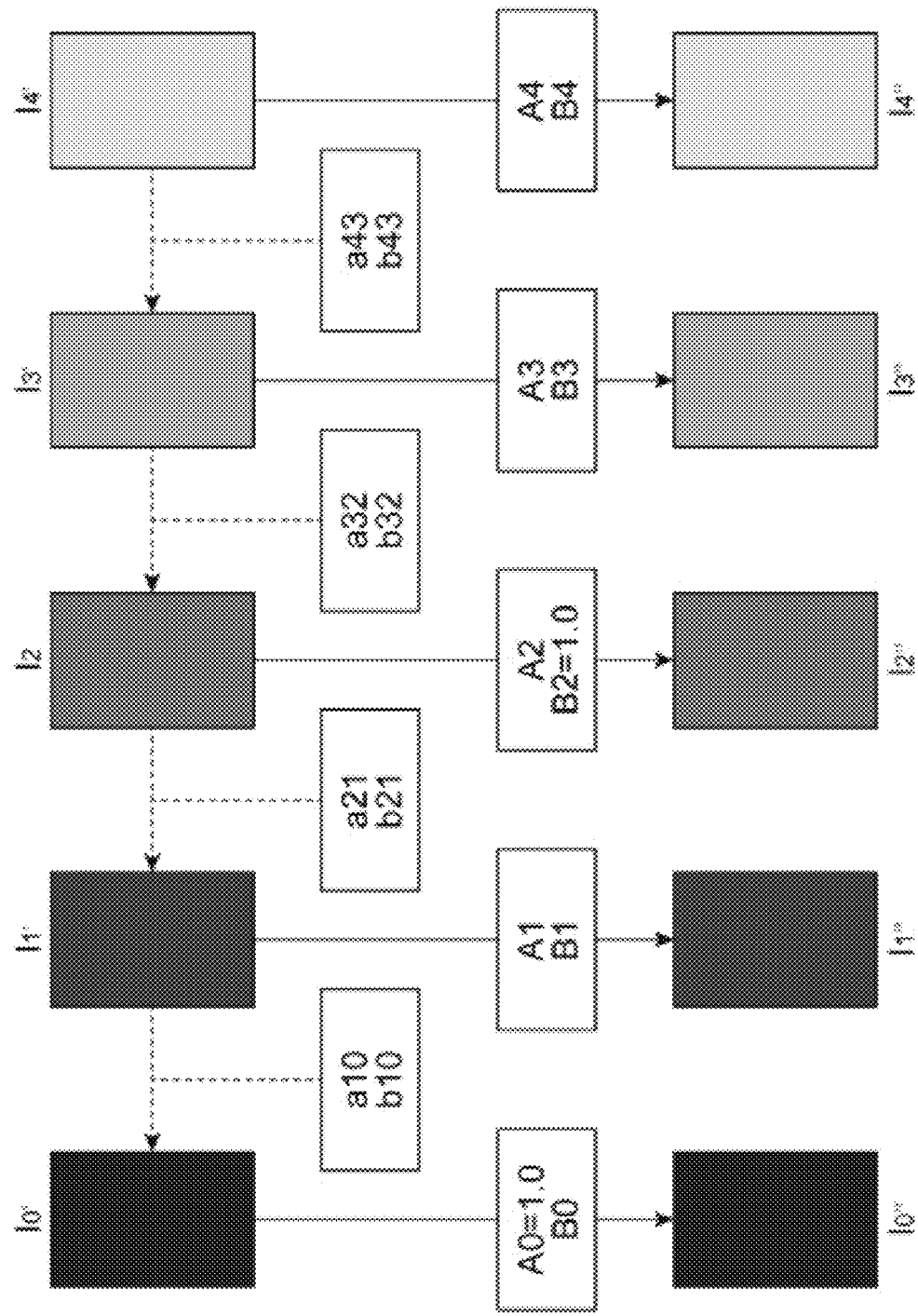
FIG. 8 is a schematic diagram explaining a luminance transform function.

FIG. 8 is a schematic diagram explaining the exposure transform function estimating process described above. Moreover, FIG. 8 shows exposure transform parameters (a10, b10), (a21, b21), (a32, b32), and (a43, b43) for conforming an image with a lower exposure among input images with close exposure conditions to an image with a higher exposure. In order to ensure that a final composite image is within an expressible range, transformation results may be kept equal to or below 1.0 by setting $A_0$ of an exposure transform parameter $(A_0, B_0)$ of the input image $I_{0'}$ with the lowest exposure to 1.0. In FIG. 8, an image after exposure transformation of the input image $I_{0'}$ is depicted as an input image $I_{0''}$. In addition, when $(A_2, B_2)$ denotes an exposure transform parameter of the reference image $I_{1'}$ with respect to the input image $I_{0'}$ with the lowest exposure, by setting $A_0$ to 1.0 and also $B_2$ to 1.0, the color thereof can be set to be equal to that of the input image at a gain of $1/A_2$. The likelihood calculating unit 13 separately performs the process described above for each of the RGB channels. Once the process of S18 is finished, the preprocessing shown in FIG. 3 is concluded.

This concludes the control process shown in FIG. 3. Due to the execution of the control process shown in FIG. 3, sampling from a subject blur region can be prevented by detecting a subject blur before estimating an exposure transform function, and the influence of data sampled from a subject blur region can be reduced by weighting. As a result, an exposure transform function can be accurately estimated. With a conventional HDR technique, a subject blur cannot be accurately corrected unless exposure adjustment has been performed and, conversely, exposure cannot be accurately adjusted unless a subject blur has been corrected. However, by detecting a subject blur (a motion of a subject) in a simplified manner before estimating an exposure transform function, the relational deadlock described above can be resolved.

Figure 9:
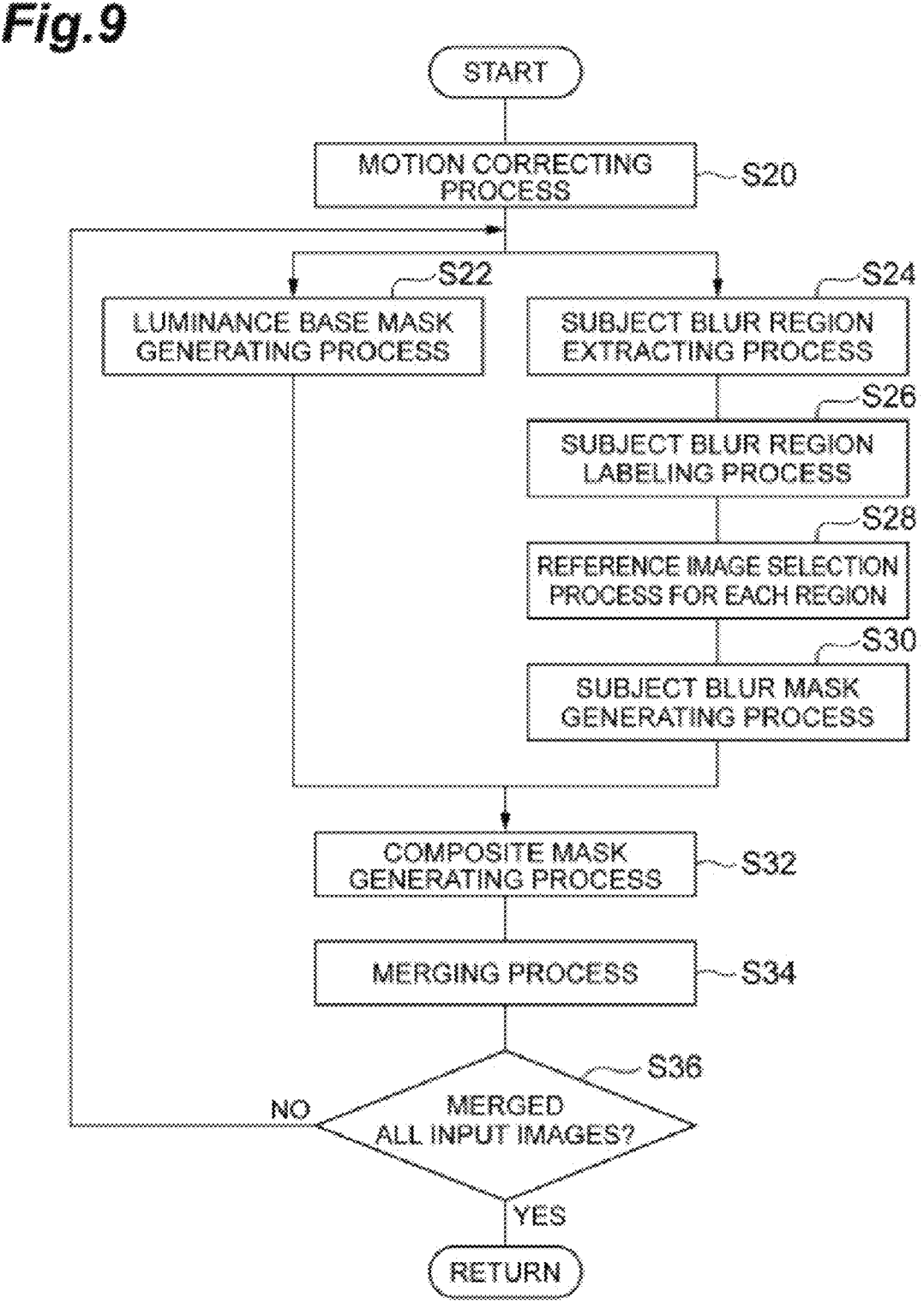
FIG. 9 is a flow chart showing a merging operation of the image processing device shown in FIG. 1.

Next, a merging operation of the image processing device 1 will be described. FIG. 9 is a flow chart for explaining HDR composition. For example, the control process shown in FIG. 9 starts upon the conclusion of the control process shown in FIG. 3.

As shown in FIG. 9, the motion correcting unit 15 substantially corrects motion (S20). In this process, in a similar manner to the process of S14 shown in FIG. 3, the motion correcting unit 15 uses a transformation matrix to correct motion of the input images $I_{0''}$ to $I_{4''}$ after exposure transformation. Alternatively, depending on the accuracy required, a subpixel interpolation algorithm or the like can be made available. Once the process of S20 is finished, a transition is made to a luminance base mask generating process and a subject blur region extracting process (S22 and S24).

Figure 10:
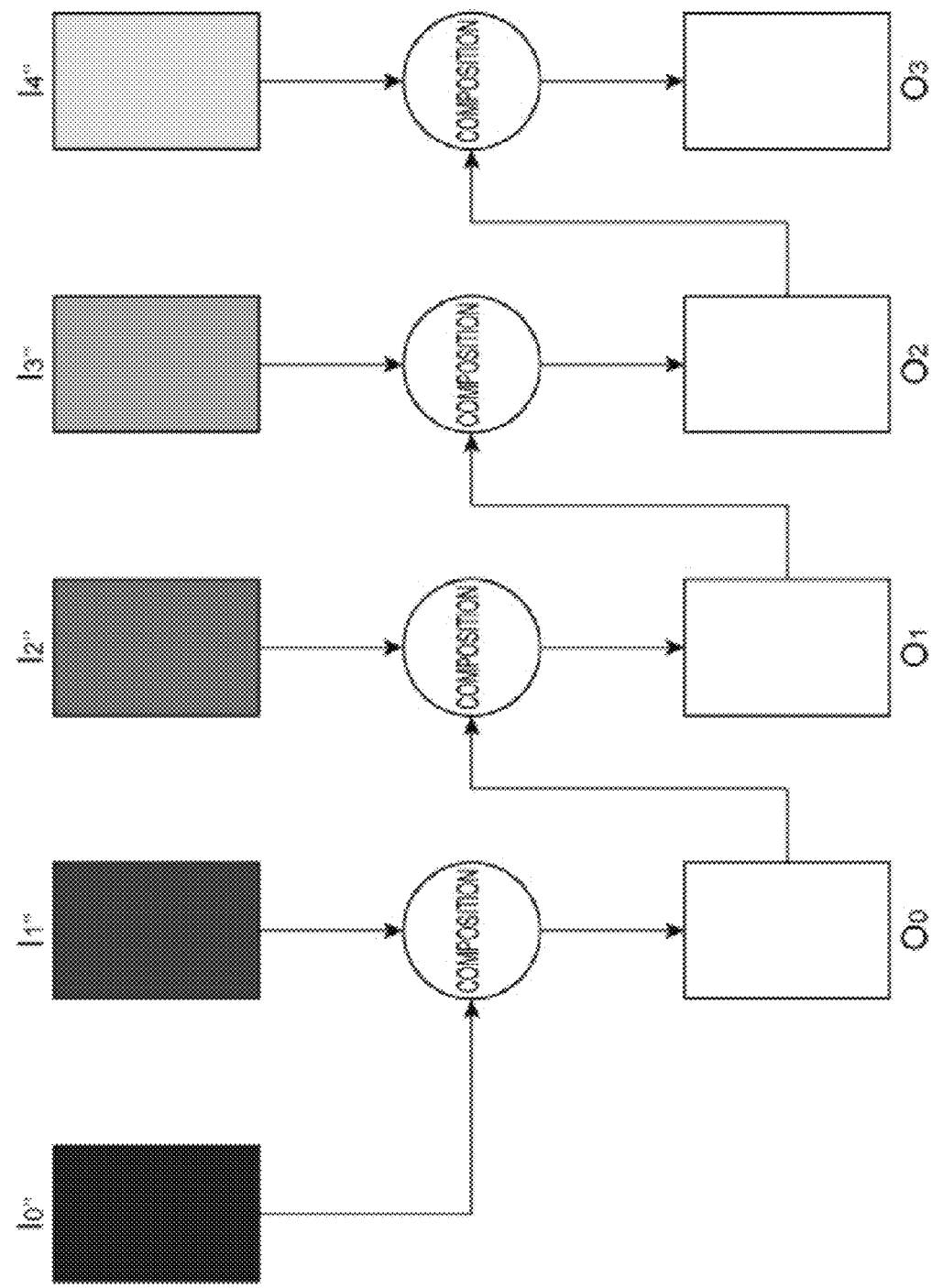
FIG. 10 is a schematic diagram explaining a flow of a merging process.
Figure 11:
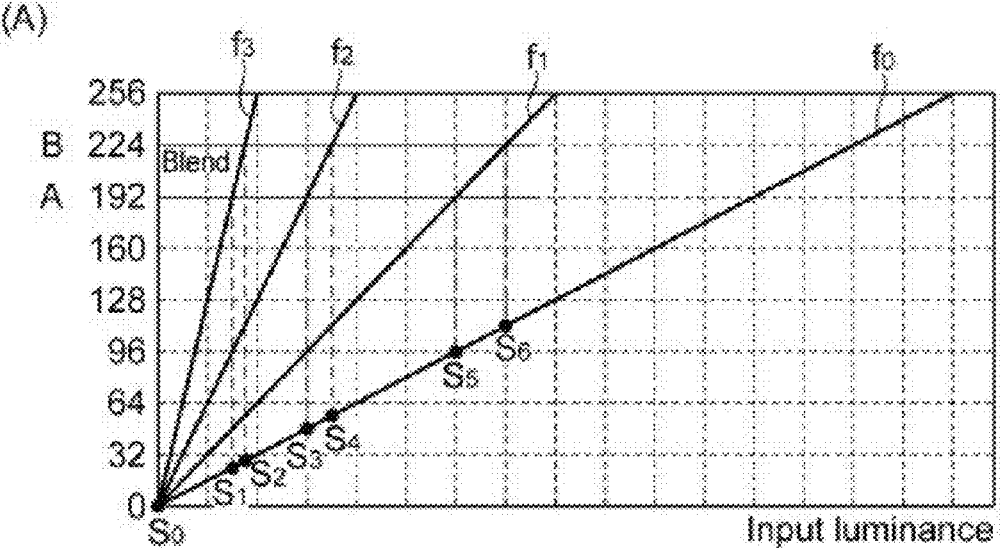
Figure 11:
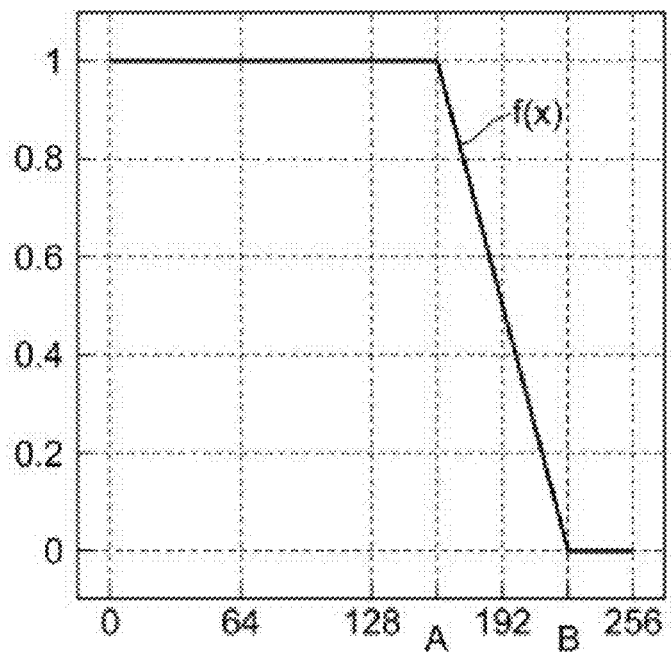
Figure 12:
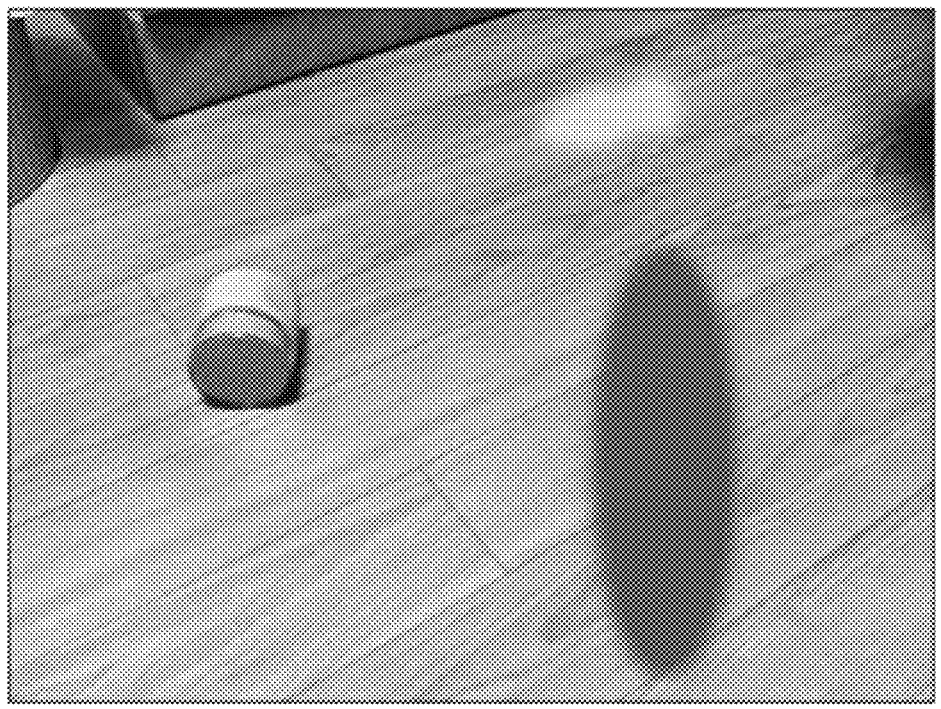
Figure 12:
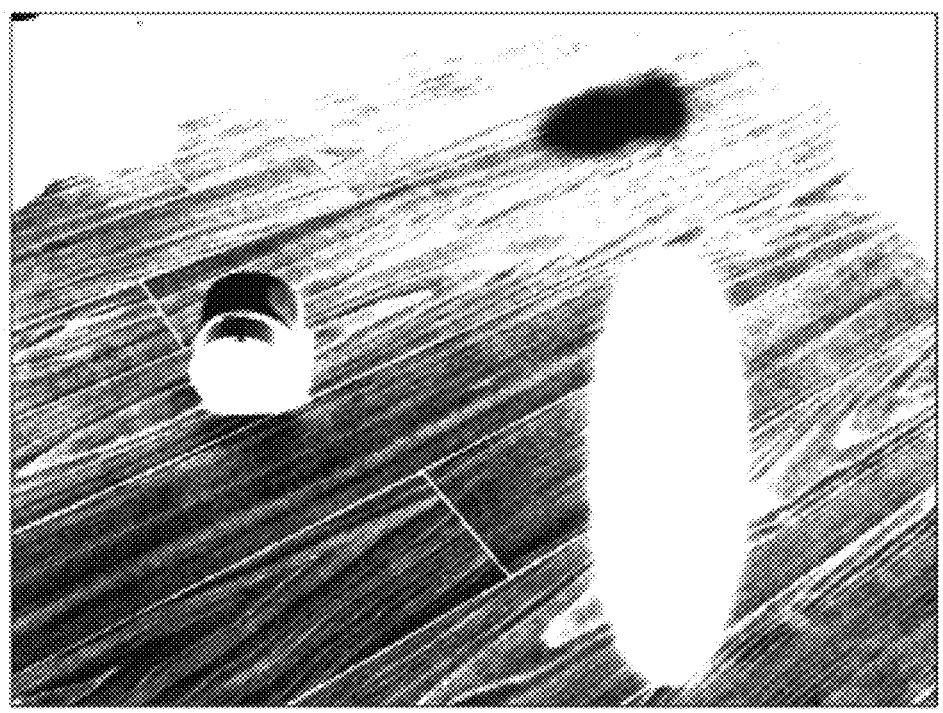

In the process of S22, the merging unit 16 generates a luminance base mask. FIG. 10 is a schematic diagram explaining a flow of a merging process. As shown in FIG. 10, merging is performed by replacing the input images $I_{1''}$ to $I_{4''}$ starting with the input image $I_{0''}$ with a low exposure. Specifically, first, a luminance base mask is generated which determines to what degree the input image $I_{1''}$ is to be merged with the input image $I_{0''}$. The luminance base mask calculates a weight from an original luminance value of the input image $I_{1''}$. For example, a weight in a vicinity of a "whiteout" region is set to 0. By setting a weight in this manner and merging so as to overlap an image with a high exposure onto an image with a low exposure, an input image with a large amount of information can invariably be selected with respect to a target pixel. FIG. 11(A) shows graphs representing a relationship between input luminance and pixel values. As shown in FIG. 11(A), functions $f_0$ to $f_3$ are graphs indicating a pixel value of which image is to be selected based on a luminance value. The larger the number of the functions $f_0$ to $f_3$ becomes, the higher the exposure of an image to which a function is to be applied. For example, when the input image $I_{0''}$ with the lowest exposure is inputted, the function $f_0$ is applied and all pixel values are adopted. Next, when the input image $I_{1''}$ is inputted, the functions $f_0$ and $f_1$ are applied. Therefore, in a luminance value range of S0 to S5, the input image $I_{1''}$ is adopted, and in a luminance value range of S6 or greater, the input image $I_{0''}$ is adopted. A composite value blended by a weight shown in FIG. 11(B) is adopted in a luminance value range of S5 to S6. Note that γ correction has been omitted in the description for the sake of simplicity. Next, when the input image $I_{2''}$ is inputted, the functions $f_0$ to $f_2$ are applied. Therefore, in a luminance value range of S0 to S3, the input image $I_{2''}$ is adopted, in a luminance value range of S4 to S5, the input image $I_{1''}$ is adopted, and in a luminance value range of S6 or greater, the input image $I_{0''}$ is adopted. A composite value blended by a weight shown in FIG. 11(B) is adopted in the luminance value ranges of S3 to S4 and S5 to S6. Next, when the input image $I_{3''}$ is inputted, the functions $f_0$ to $f_3$ are applied. Therefore, in a luminance value range of S0 to S1, the input image $I_{3''}$ is adopted, in a luminance value range of S2 to S3, the input image $I_{2''}$ is adopted, in a luminance value range of S4 to S5, the input image $I_{1''}$ is adopted, and in a luminance value range of S6 or greater, the input image $I_{0''}$ is adopted. A composite value blended by a weight shown in FIG. 11(B) is adopted in the luminance value ranges of S1 to S2, S3 to S4, and S5 to S6. As described above, an image with a high exposure is preferentially adopted. In addition, for "whiteout" region portions, an image with a low exposure is adopted and a boundary portion is smoothly blended. An example of a luminance base mask that is an image representation of the graph shown in FIG. 11(A) is shown in FIG. 12. FIG. 12(A) shows an input image and FIG. 12(B) shows a luminance base mask of the input image. In FIG. 12(B), use of 100% of a pixel value of an input image is expressed as white and non-use of 100% of a pixel value of an input image is expressed as black. Once the process of S22 is finished, a transition is made to a merging mask generating process (S32).

Figure 13:
Figure 13:
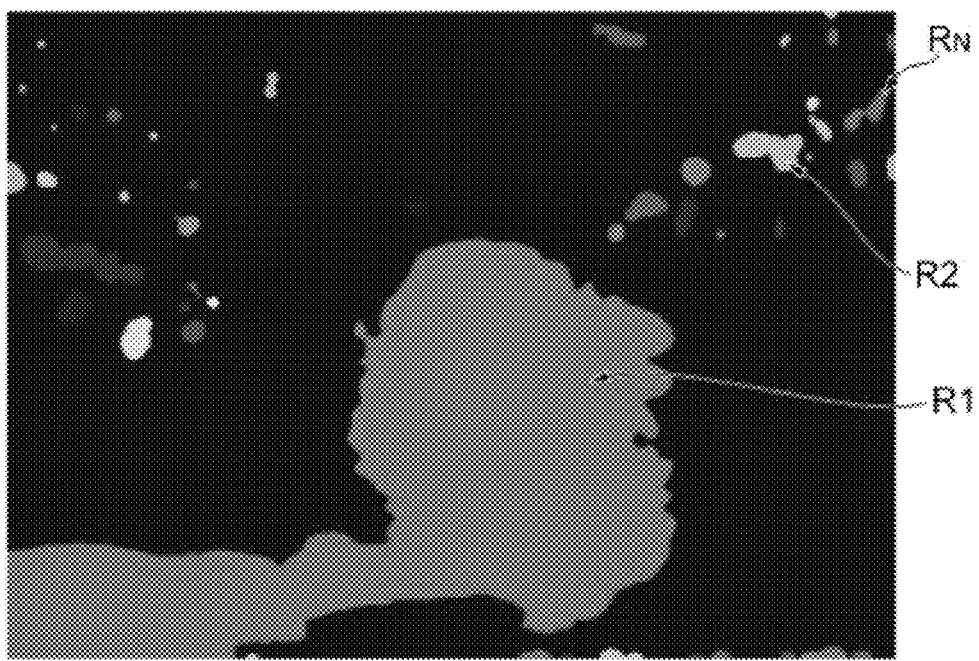

Meanwhile, in the process of S24, the merging unit 16 extracts a subject blur region. For example, the merging unit 16 calculates a difference image in a similar manner to the process of S16 in FIG. 3 and extracts a region with a subject motion likelihood that is equal to or higher than a predetermined value as a subject blur region. FIG. 13(A) shows an example of a difference image including a subject blur region. Once the process of S24 is finished, a transition is made to a labeling process (S26).

In the process of S26, the merging unit 16 labels subject blur regions. The merging unit 16 sets one label $R_n$ to a continuous subject blur region. FIG. 13(B) shows an example of labeled continuous regions. Once the process of S26 is finished, a transition is made to a reference image selecting process of each region (S28).

In the process of S28, the merging unit 16 sets a reference image for each subject blur region. Basically, the merging unit 16 prioritizes a high-exposure image. For example, when merging the input image $I_{0'''}$ and the input image $I_{1'''}$, the input image $I_{1'''}$ is selected as the reference image. However, when a subject blur region is affected by a "whiteout" region in the input image $I_{1'''}$, the input image $I_{0'''}$ is selected as the reference image. Once the process of S28 is finished, a transition is made to a subject blur mask generating process (S30).

Figure 14:
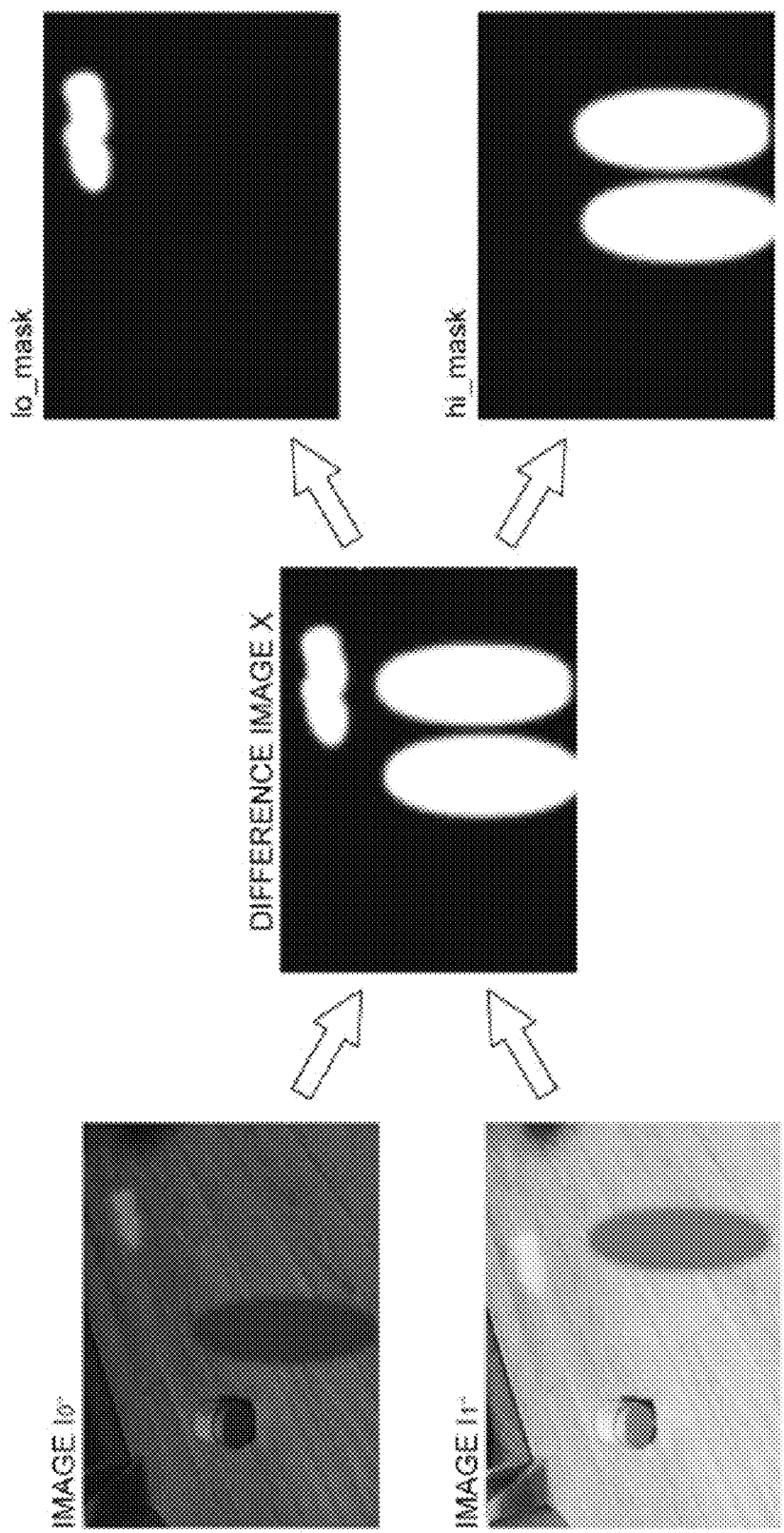
FIG. 14 is a schematic diagram explaining a flow of a subject blur mask generating process.

In the process of S30, the merging unit 16 generates a subject blur mask for each subject blur region. When a high-exposure image is prioritized to be the reference image, the merging unit 16 generates a second mask. On the other hand, when a low-exposure image is prioritized to be the reference image, the merging unit 16 generates a first mask. FIG. 14 is a schematic diagram explaining the series of processes from S24 to S30. As shown in FIG. 14, when merging the input image $I_{0'''}$ and the input image $I_{1'''}$, a difference image X is obtained, and a first mask (lo_mask) or a second mask (hi_mask) is generated for each region in the difference image. In other words, in a region in which the subject moves, by using the subject blur mask to let the pixel values input only from a single image, the ghost phenomenon described earlier can be avoided. Once the process of S30 is finished, a transition is made to the merging mask generating process (S32).

Figure 15:
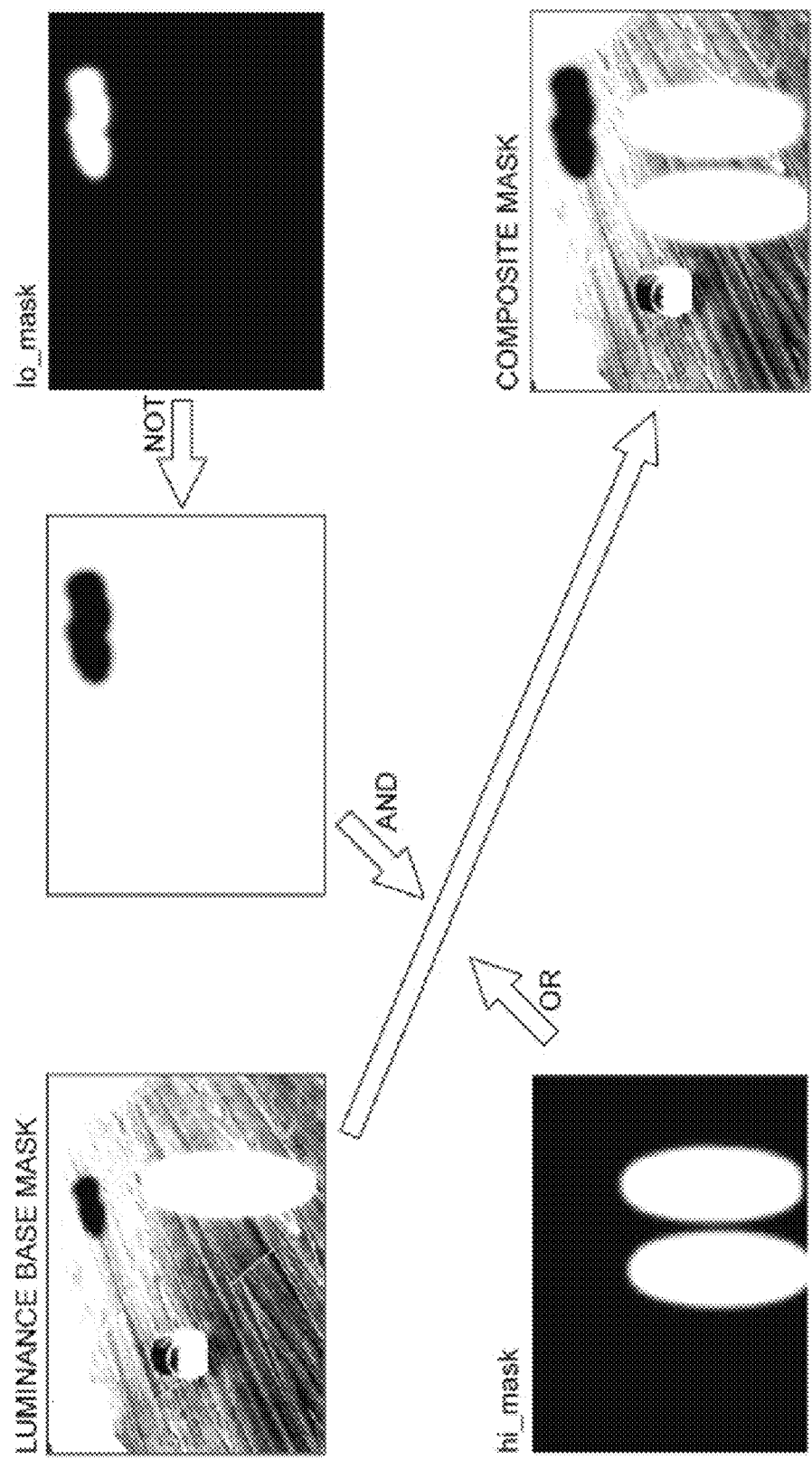
FIG. 15 is a schematic diagram explaining a flow of a merging mask generating process.

In the process of S32, the merging unit 16 generates a merging mask based on a luminance base mask and a subject blur mask. FIG. 15 is a schematic diagram explaining a merging mask generating process. As shown in FIG. 15, the luminance base mask is multiplied by an inverted image of the lo_mask. In addition, the hi_mask is added to the luminance base mask. Through such combinations, a merging mask is generated. Once the process of S32 is finished, a transition is made to a merging process (S34).

In the process of S34, a merging process is performed by the merging unit 16 according to the merging mask created in the process of S32. Moreover, when a luminance value $P_0$ of an image already merged and a luminance value $P_1$ of an input image to which the exposure transform function is applied are merged at a weight a, a luminance value $P_2$ after composition can be obtained by the following expression.

$$P_2 = (1-a) \cdot P_0 + a \cdot P_1$$

In this case, with the image having the lowest exposure, an entire region thereof is merged as-is. Once the process of S34 is finished, a transition is made to an input screen confirming process (S36).

In the process of S36, a judgment is made on whether or not the merging unit 16 has merged all input images. If all of the input images have not been merged, a transition is made to the processes of S22 and S24. Subsequently, for example, a merging process of a composite image $O_0$ of the input image $I_{0'''}$ and the input image $I_{1'''}$ with a new input image $I_{0''''}$ is performed as shown in FIG. 10. On the other hand, if all of the input images have been merged, the control process shown in FIG. 9 is concluded.

By executing the control process shown in FIG. 9, a subject blur-corrected HDR composite image is generated.

Next, an image processing program that causes the mobile terminal (computer) 2 to function as the aforementioned image processing device 1 will be described.

The image processing program comprises a main module, an input module, and an arithmetic processing module. The main module is a portion that provides integrated control over image processing. The input module causes the mobile terminal 2 to operate so as to acquire an input image. The arithmetic processing module comprises a motion information acquiring module, a likelihood calculating module, an exposure estimating module, a motion correcting module, and a merging module. Functions that are realized by executing the main module, the input module, and the arithmetic processing module are respectively similar to the functions of the image input unit 10, the motion information acquiring unit 12, the likelihood calculating unit 13, the exposure estimating unit 14, the motion correcting unit 15, and the merging unit 16 of the image processing device 1 described earlier.

For example, the image processing program is provided by a recording medium such as a ROM or by a semiconductor memory. Alternatively, the image processing program may be provided via a network as a data signal.

As described above, the image processing device 1, the image processing method, and the image processing program according to the present embodiment calculate a likelihood of a motion of a subject at each pixel based on a difference between a first image and a second image before conforming the exposures of the first image and the second image to each other. Subsequently, based on the likelihood of motion of the subject, an exposure transform function that conforms the exposure conditions of the first image and the second image to each other is estimated. Since a likelihood of motion of the subject is considered when conforming exposures to each other in this manner, for example, exposures can be conformed to each other with the exception of a region in which a change in color may have occurred due to a motion of a subject. Consequently, an appropriate composite image can be generated. Furthermore, a subject blur mask can be used to prevent an occurrence of a subject blur (a ghost-like representation), and thereby it is possible to produce a clear image.

(Second Embodiment)

An image processing device according to a second embodiment has substantially the same configuration as the image processing device according to the first embodiment except that the image processing device of this embodiment includes a processor for post-processing after HDR composition. In the following description, the difference from the first embodiment will be described mainly, and the redundant description thereof will not be provided.

Figure 16:
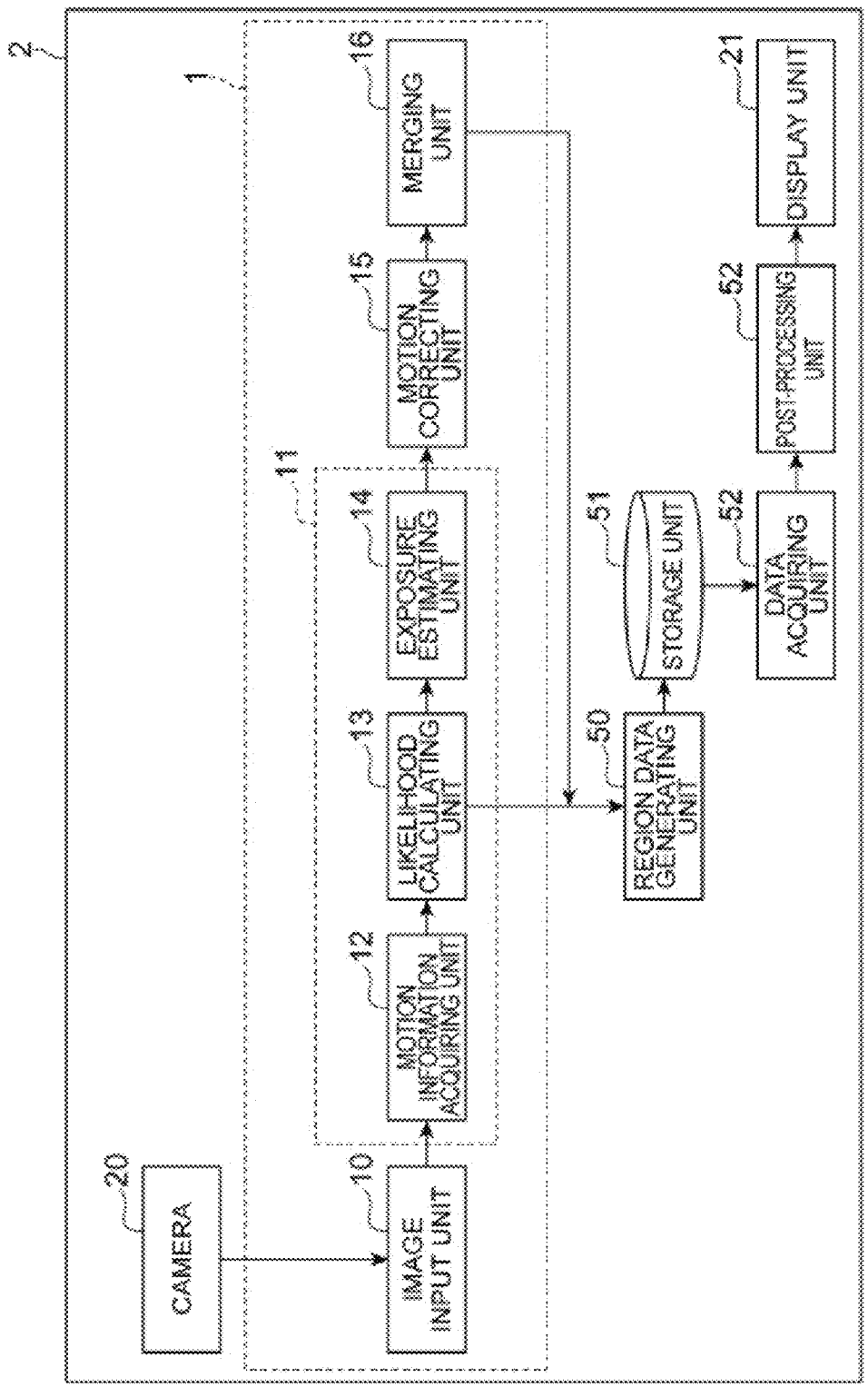
FIG. 16 is a functional block diagram of a portable terminal on which an image processing device according to an embodiment is mounted.

FIG. 16 is a functional block diagram of a portable terminal 2 that includes an image processing device 1 according to the second embodiment. The portable terminal 2 illustrated in FIG. 16 has the hardware configuration illustrated in FIG. 2 similarly to the first embodiment. As illustrated in FIG. 16, the image processing device 1 is different from the image processing device 1 according to the first embodiment in that the image processing device 1 of this embodiment includes a region data generating unit 50, a recording unit 51, a data acquiring unit 52, and a post-processing unit (image processing unit) 53.

The region data generating unit 50 has a function of generating region data based on a subject motion likelihood. The region data generating unit 50 inputs the subject motion likelihood calculated by the likelihood calculating unit 13, for example, and generates the region data. Alternatively, the region data generating unit 50 may input information on a moving subject region or a subject blur mask from the merging unit 16 to generate the region data. Here, the region data is information for specifying a moving subject region (target region) in a composite image where a moving subject is present. For example, the region data used may be data that is coded as "1" for coordinates of pixels where a moving subject is present and as "0" for the other coordinates, or may be one that graphically represents such data. Depending on the processing content of post-processing, since it may be sufficient for the region data to be able to specify the positional coordinates of a moving subject region, the region data may be information of which the approximate range can be understood. Due to this setting, the region data may not always have the same size (pixel scale) as the composite image but may be compressed according to various methods. For example, when the region data is graphically represented, the resolution may be decreased so that it is reduced by approximately ¼ or ¹⁄₁₆. Similarly, the region data may be the coordinate (x, y) of the center or the radius r of the moving subject region. That is, the region data may not be the moving subject region itself of the composite image where the moving subject is present but may only need to include the moving subject region. For example, the region data may be a region that is generated based on the moving subject region. That is, the region data may be one or a plurality of regions depicted by a rectangle, a circle, or an aggregation thereof that includes the moving subject region. In this case, although the region data may include a region that is not a moving subject, it is possible to effectively specify the moving subject region.

The region data generating unit 50 stores the generated region data in the recording unit 51 in association with the composite image. The recording unit 51 is a recording medium.

The region data generating unit 50 may record original pixel information in association with the region data. The original pixel information is information regarding pixels used for creating a moving subject region. For example, the original pixel information may be information just indicating that "the moving subject region is merged by using pixel values having low luminance values that are forcibly selected among the images to be merged." The original pixel information can be acquired by using the lo_mask created by the merging unit 16, for example. Alternatively, the original pixel information may be information just indicating that "the moving subject region is merged by using pixel values having high luminance values that are forcibly selected among the images to be merged." The original pixel information can be acquired by using the hi_mask created by the merging unit 16, for example. Moreover, as more detail information, the original pixel information may be information capable of identifying whether the moving subject region is merged by using pixels where blackout or whiteout spots are present. The original pixel information used may be encoded data that is coded as "0" when a blackout pixel is used, "255" when a whiteout pixel is used, and "124" for the other cases according to a pixel position of the moving subject region, for example. Alternatively, information necessary for calculating the original pixel information may be acquired as the original image information. For example, an exposure conversion parameter (a, b) used for generating the moving subject region may be employed as the original image information. Since the use of the exposure conversion parameter (a, b) enables the pixel value before conversion to be estimated from the pixel value of the moving subject region of the composite image, it is possible to later identify whether the moving subject region has been merged by using a blackout or whiteout pixel. When three or more images are to be merged the exposure conversion parameter (a, b) and the weight a used during merging may be the original pixel information. When the exposure conversion parameter (a, b) is associated with an input image, the number for identifying the input image may be the original pixel information. The original pixel information can be acquired from the calculation results of the merging unit 16, for example. Moreover, a ratio ((composite image luminance value)/(original image luminance value)) of an increase in the luminance value from that of the original image in the moving subject region during creation of the composite image may be calculated for each pixel value or for each moving subject region and may be used as the original pixel information.

The data acquiring unit 52 is configured to be able to refer to the recording unit 51. The data acquiring unit 52 has a function of acquiring a composite image and region data associated with the composite image by referring to the recording unit 51. The data acquiring unit 52 may further acquire original pixel information associated with the region data.

The post-processing unit 53 has a function of performing post-processing on the composite image. The post-processing unit 53 has a function of performing different image processing with respect to the moving subject region and the other regions of the composite image using the region data. The image processing includes a tone mapping process, a noise removal process (noise reduction process), an object identification process, and other pixel value processing. For example, the post-processing unit 53 performs a first process on the moving subject region and performs a second process different from the first process with respect to the regions other than the moving subject region. The first or second process includes "perform no process." For example, the "different process" also includes performing a filtering process on regions other than the moving subject region without performing a filtering process on the moving subject region. Since the post-processing unit 53 performs post-processing by taking the moving subject region into consideration, it is possible to reduce the influence on the post-processing results, of the merging process that involves converting and merging pixel values.

The post-processing unit 53 may further determine image processing that is to be performed by referring to the original pixel information. For example, the post-processing unit 53 may change the processes between a case where the moving subject region is generated by using the lo_mask that forcibly selects pixel values having low luminance values among the images to be merged and a case where the moving subject region is generated by using the hi_mask that forcibly selects pixel values having high luminance values among the images to be merged. For example, when the moving subject region is generated by using the pixel values having low luminance values, the moving subject region is likely to be a region in which the luminance values are forcibly increased for the merging process and a region in which the pixel information is basically insufficient. Moreover, for example, when the moving subject region is generated by the hi_mask and includes a whiteout pixel, the whiteout region is likely to be a region in which a predetermined luminance value is forcibly set for the merging process and a region in which the pixel information is basically lacking (a region where the pixel information is not clear). As above, since there is a difference according to the original input image whether the pixel information is not sufficient or the pixel information is originally not clear, it is possible to obtain appropriately results by performing post-processing by taking this difference into consideration.

Figure 17:
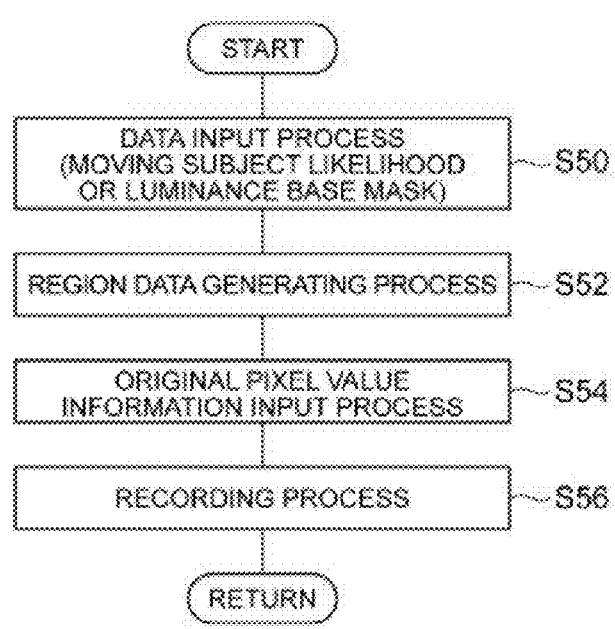
FIG. 17 is a flowchart illustrating a region data operation of the image processing device illustrated in FIG. 16.

Next, a region data operation of the image processing device 1 according to the present embodiment will be described. FIG. 17 is a flowchart illustrating the region data operation of the image processing device. The control process illustrated in FIG. 17 is executed after the control process illustrated in FIG. 3 or 9 is executed.

First, the region data generating unit 50 performs a data input process (S50). In the process of S50, the region data generating unit 50 acquires the subject motion likelihood at each pixel position from the likelihood calculating unit 13 or the merging unit 16. The region data generating unit 50 may acquire information on the subject blur mask from the merging unit 16. When the process of S50 ends, a region data generating process (S52).

Figure 18:
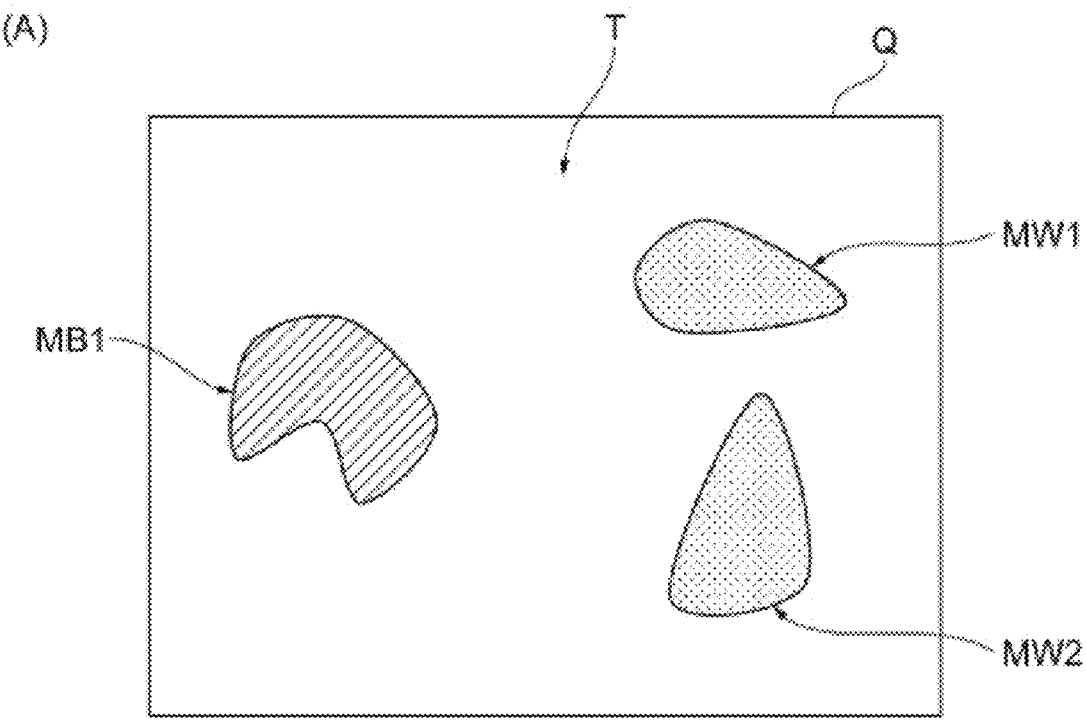
FIG. 18 illustrates an example of region data.
Figure 18:
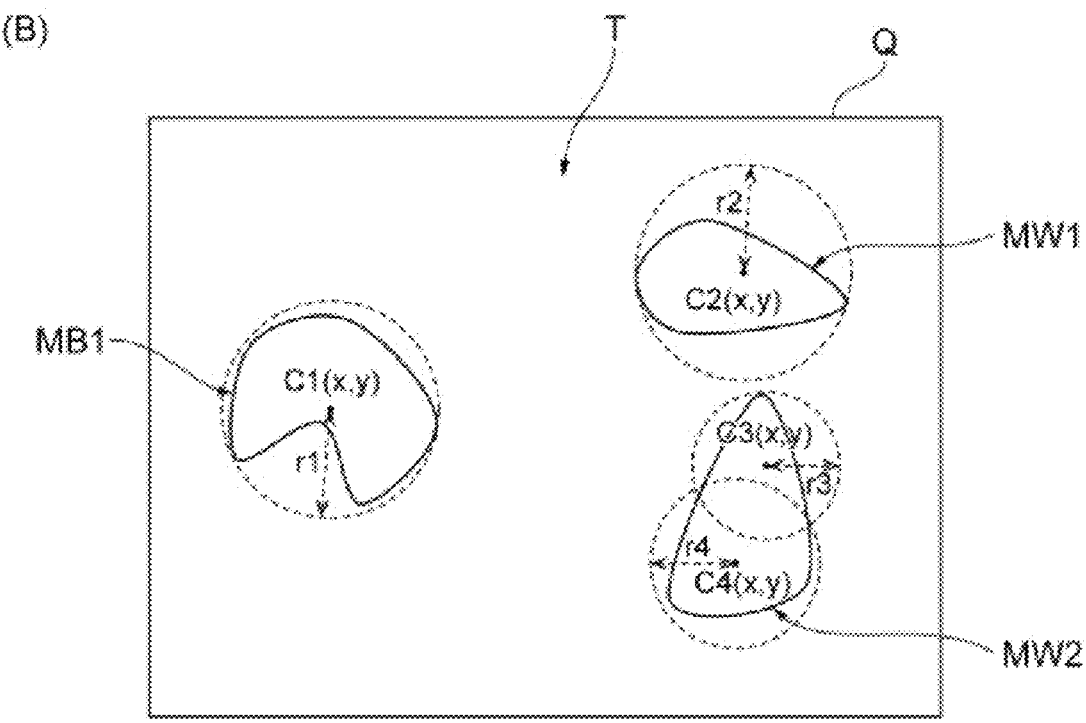

In the process of S52, the region data generating unit 50 generates region data based on the subject motion likelihood acquired in S52. For example, the region data generating unit 50 generates the region data by coding pixel positions at which the subject motion likelihood is a predetermined value or more as "1" and the other coordinates as "0." FIG. 18(A) illustrates one that graphically represents the coded data. FIG. 18(A) illustrates moving subject regions MB1, MW1, and MW2 in which the subject motion likelihood in the coordinate system of a composite image Q is a predetermined value or more. A region T other than the moving subject regions MB1, MW1, and MW2 is a region on which a motionless subject is rendered. Alternatively, the region data generating unit 50 may input a subject blur mask to be directly used as the region data. Moreover, the region data generating unit 50 decreases the resolution of the region data to compress the data amount. Alternatively, as illustrated in FIG. 18(B), the region data generating unit 50 may generate the central coordinate C1 and the radius r1 corresponding to the moving subject region MB1 as the region data. Similarly, the region data generating unit 50 may generate the central coordinate C2 and the radius r2 corresponding to the moving subject region MW1. The moving subject region may be represented by a plurality of circles. For example, the region data generating unit 50 may generate the central coordinate C3 and the radius r3 and the central coordinate C4 and the radius r4 corresponding to the moving subject region MW2 as the region data. When the process of S52 ends, an original pixel value information input process is performed (S54).

In the process of S54, the region data generating unit 50 inputs original pixel value information for each moving subject region obtained in the process of S52. For example, the region data generating unit 50 acquires a subject blur mask from the merging unit 16 and acquires information on whether the respective moving subject regions have been generated by using the lo_mask as the original pixel value information. For example, the region data generating unit 50 acquires a subject blur mask from the merging unit 16 and acquires information on whether the respective moving subject regions have been generated by using the lo_mask or the hi_mask as the original pixel value information. In this way, the moving subject region can be classified in two types. In this case, the moving subject regions are labeled to identify the moving subject region. In this way, for example, the moving subject regions can be classified into the moving subject region MB1 that is generated by using the lo_mask illustrated in FIG. 18(A) and the moving subject regions MW1 and MW2 that is generated by using the hi_mask. Another information may be acquired as the original pixel value information. For example, the region data generating unit 50 may acquire, from the merging unit 16, the exposure conversion parameter (a, b) used for generating the moving subject region or the weight a used during merging as the original pixel value information. When the process of S54 ends, a recording process is performed (S56).

In the process of S56, the region data generating unit 50 records the composite image and the region data generated in the process of S52 in association. Moreover, in the process of S56, the region data and the original pixel value information created in the process of S52 may be further recorded in association. When the process of S56 ends, the control process illustrated in FIG. 17 ends.

Figure 19:
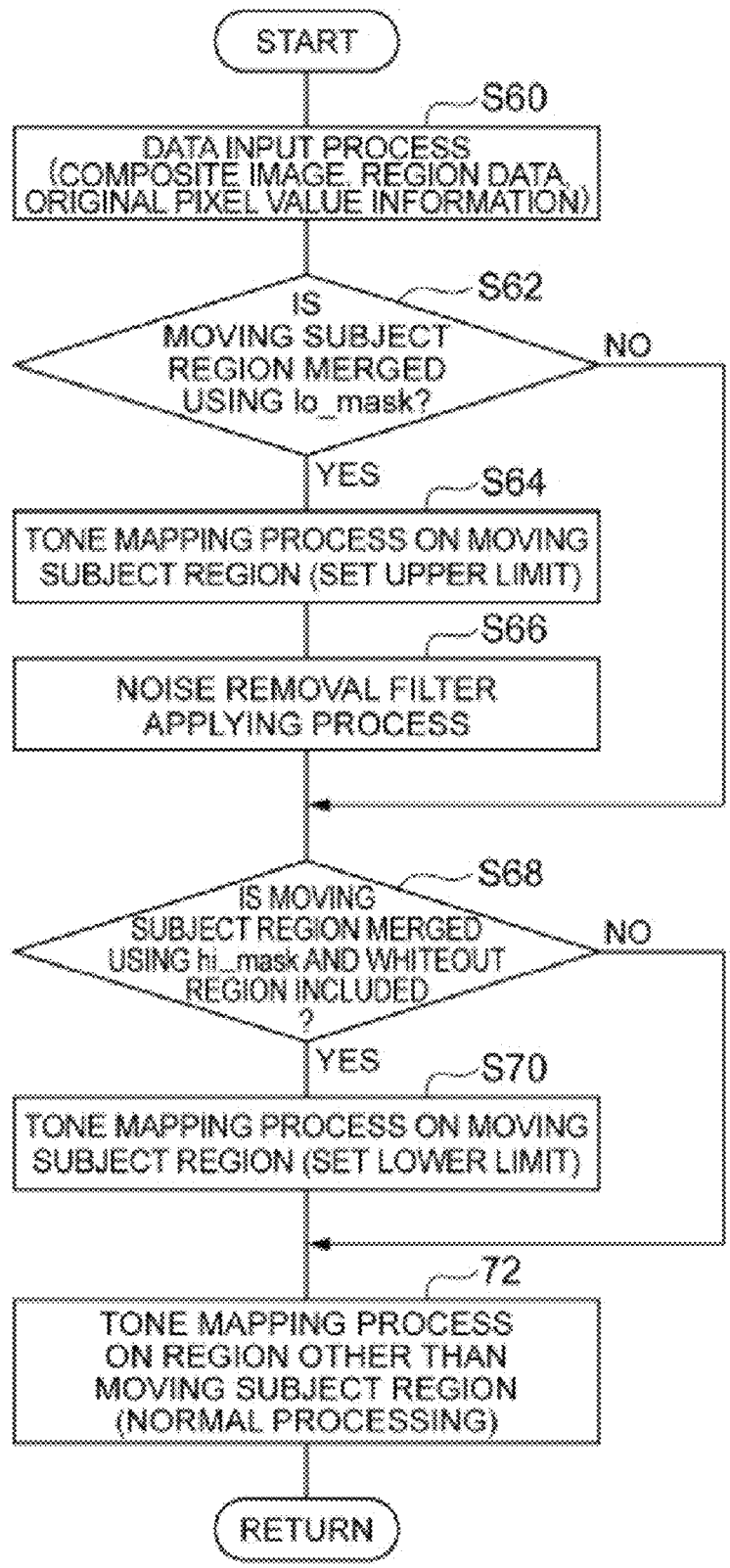
FIG. 19 is a flowchart illustrating a tone mapping operation of the image processing device illustrated in FIG. 16.

Next, a post-processing operation of the image processing device 1 according to the present embodiment will be described. In the following description, for better understanding, an example of performing a tone mapping process on a composite image will be described. FIG. 19 is a flowchart illustrating a tone mapping operation of the image processing device. The control process illustrated in FIG. 19 is executed after the control process illustrated in FIG. 17 ends.

As illustrated in FIG. 19, first, the data acquiring unit 52 performs a data input process (S60). In the process of S60, the data acquiring unit 52 inputs the composite image, the region data, and the original pixel value information by referring to the recording unit 51. When the process of S60 ends, a moving subject region determining process is performed (S62).

In the process of S62, the post-processing unit 53 determines whether the moving subject region represented by the region data is merged by using the lo_mask that forcibly selects pixel values having low luminance values among the images to be merged by using the region data and the original pixel value information acquired in the process of S60. When the post-processing unit 53 determines in the process of S62 that the moving subject region is merged by using the lo_mask, the tone mapping process is performed on the region (S64).

In the process of S64, the post-processing unit 53 performs a tone mapping process on the moving subject region. In the moving subject region, since pixel values having low luminance values are forcibly selected among the images to be merged, there is a possibility that the luminance values are increased during merging. That is, the moving subject region is likely to be a region in which a pixel region where the pixel information is already not sufficient is increased unreasonably. Due to this reason, if the luminance value is further increased in the tone mapping process, noise may occur. Therefore, in the moving subject region, a first threshold value is set as an upper limit value and the tone mapping process is performed so that the luminance value is not increased to the first threshold value or more. The first threshold value is set to a value which is the pixel value of the original image multiplied by n, for example. Moreover, the value n may be adjusted according to the noise amount of an image sensor. For example, when the noise amount of an image sensor is large, the value n may be decreased. When the process of S64 ends, a noise reduction filter applying process is performed (S66).

In the process of S66, a noise reduction filter is applied to the moving subject region in which the tone mapping process is performed in S64. As the noise reduction filter, a filter that performs a smoothing process or the like is employed, for example. In the process of S66, it may be determined whether a noise reduction filter will be applied based on a luminance value conversion ratio $n_1$ during the merging process and a luminance value conversion ratio $n_2$ during the tone mapping process in S64. For example, if $n_1/n_2$ is a predetermined value or more, the noise reduction filter may be applied. In this case, the larger $n_1/n_2$ becomes, the larger the strength of the noise reduction filter may be set. When the process of S66 ends, a moving subject region determining process is performed (S68).

In the process of S68, the post-processing unit 53 determines the following content using the region data and the original pixel value information acquired in the process of S60. The post-processing unit 53 determines whether the moving subject region represented by the region data is merged the hi_mask that forcibly selects pixel values having high luminance values among the images to be merged and includes a whiteout region. When the post-processing unit 53 determines in the process of S68 that the moving subject region is merged by using the lo_mask, the tone mapping process is performed on the region (S70).

In the process of S70, the post-processing unit 53 performs a tone mapping process on the moving subject region. The whiteout region is likely to be a region in which a predetermined luminance value is forcibly set for the merging process and a region where the pixel information is basically lacking (a region where the pixel information is not clear). That is, since the tone mapping process is performed based on the pixel value that is conveniently set for the merging process, appropriate results may not be obtained. Thus, it is necessary to perform a predetermined process on the whiteout region depending on the demanded result of the tone mapping process. For example, when there is a demand to obtain a natural image by using the tone mapping process, the post-processing unit 53 performs the tone mapping process so that the pixel value of the whiteout region approaches the pixel value of the original image. Alternatively, the post-processing unit 53 may not perform any processing on the whiteout region (that is, the whiteout state is maintained). When the process of S70 ends, a tone mapping process is performed on other regions (S72).

In the process of S72, the tone mapping process is performs on a region other than the moving subject region. This process is a normal tone mapping process that is performed according to a desired demand. When the process of S72 ends, the control process illustrated in FIG. 19 ends.

On the other hand, when the post-processing unit 53 determines in the process of S62 that the moving subject region is not merged by using the lo_mask, a moving subject region determining process is performed (S68). Moreover, when the post-processing unit 53 determines in the process of S68 that the moving subject region is not merged by using the lo_mask, the tone mapping process is performed on other regions (S72).

By executing the control process illustrated in FIG. 19, since different post-processing can be performed between the moving subject region and the region other than the moving subject region, it is possible to prevent the merging process from affecting the subsequent process in such a manner to generate noise, for example. The process of S60 is a data acquiring step, and the processes of S64, S66, S70, and S72 are an image processing step.

Next, an image processing program for causing the portable terminal (computer) 2 to function as the image processing device 1 will be described.

The image processing program includes a main module, an input module, and an arithmetic processing module. The main module is a portion that controls image processing in a centralized manner. The input module operates the portable terminal 2 so as to acquire input images. The arithmetic processing module includes a motion information acquisition module, a likelihood calculation module, an exposure estimation module, a motion correction module, an image merging module, a region data generating module, a data acquisition module, and a post-processing module. The functions realized by executing the main module, the input module, and the arithmetic processing module are the same as the functions of the image input unit 10, the motion information acquiring unit 12, the likelihood calculating unit 13, the exposure estimating unit 14, the motion correcting unit 15, the merging unit 16, the region data generating unit 50, the data acquiring unit 52, and the post-processing unit 53 of the image processing device 1, respectively.

The image processing method is provided as a recording medium such as a ROM or a semiconductor memory, for example. Moreover, the image processing program may be provided via a network as data signals.

According to the image processing device 1, the image processing method, and the image processing program according to the second embodiment, when the post-processing unit 53 performs image processing on the composite image, different processing can be performed between the region, on which a moving subject is rendered and the other region, using the region data. During the merging process, various image processing is performed on the region in which the moving subject is captured. Due to this, by performing different image processes between the region in which the moving subject is captured and the other region rather than performing the same image processing on the entire image, it is possible to obviate the influence of the processing during merging from becoming significant in the subsequent steps. Even when HDR composition with subject blur suppression is performed by using the image information of the input image (original image) only, it is possible to perform the subsequent steps appropriately. Moreover, by recording the composite image and the region data in the recording unit 51, it is possible to appropriately perform the subsequent steps at a desired timing as well as during capturing or merging. Further, by performing different tone mapping processes in the respective regions, it is possible to obviate much noise from being generated in the target region and to obviate the color of the target region from becoming unnatural.

The above-described embodiment illustrates an example of the image processing device according to the present invention. The image processing device according to the present invention is not limited to the image processing device 1 according to the embodiments, the image processing device according to the embodiments may be modified without departing from the spirit disclosed in the claims or may be applied to other devices.

For example, in the respective embodiments, although an example in which the camera 20 acquires frame images has been described, the image may be transmitted via a network from another apparatus. Moreover, when the composite image is not displayed but is recorded only, the display unit 21 may be not provided.

Moreover, the image processing device 1 according to the respective embodiments may be operated together with a camera shake correcting device.

The processing sequence of the control process illustrated in FIG. 19 may be changed. For example, the process of S72 may be performed immediately after the process of S60. The processes of S62 to S66 may be executed after the processes of S68 to S70 are executed. Further, in the process of S68, it may be determined whether a whiteout region is included in the moving subject region merged by using the lo_mask as well as the moving subject region merged by using the hi_mask, and then, the process of S70 may be executed.

PRACTICAL EXAMPLES

Hereinafter, practical examples and comparative examples carried out by the present inventor for describing the advantageous effects will be described.

(Input Image Having Blackout Region in Moving Subject Region)

First image and second image in which a moving subject is captured are prepared as input images for HDR composition (see FIGS. 20(A) and 20(B)). FIG. 20(A) illustrates an input image having a low luminance value, and FIG. 20(B) illustrates an input image having a high luminance value. In this example, a person moves from left to right. Moreover, a suit portion of the person has a blackout portion.

First Comparative Example

Figure 20:
Figure 20:
Figure 21:
Figure 21:
Figure 22:
FIG. 22 is an enlarged view of a portion of the moving subject region of the first comparative example illustrated in FIG. 21(B)

A tone mapping process was performed on an entire HDR image generated from the two input images illustrated in FIG. 20. The results are illustrated in FIGS. 21 and 22. FIG. 21(A) illustrates the image after the tone mapping process, and FIG. 21(B) illustrates an image for describing a moving subject region Z1 in FIG. 21(A). FIG. 22 is an enlarged view of a portion of the moving subject region Z1 of the first comparative example illustrated in FIG. 21(B).

First Practical Example

Figure 23:
Figure 23:
Figure 24:
FIG. 24 is an enlarged view of a portion of a moving subject region of the first practical example illustrated in FIG. 23(B)

A tone mapping process was applied to the HDR image generated from the two input images illustrated in FIG. 20 and a noise reduction filter was applied to the moving subject region. The results are illustrated in FIGS. 23 and 24. FIG. 23(A) illustrates the image to which a noise reduction filter is applied, and FIG. 23(B) illustrates an image for describing a moving subject region Z1 in FIG. 23(A). FIG. 24 is an enlarged view of a portion of the moving subject region Z1 of the first practical example illustrated in FIG. 23(B).

When FIG. 22 which illustrates the results of the first comparative example and FIG. 24 which illustrates the results of the first practical example are compared, it was found that the first practical example produced a high quality image with reduced noise as compared to the first comparative example.

(Input Image Having Whiteout Region in Moving Subject Region)

First image and second image in which a moving subject is captured are prepared as input images for HDR composition (see FIGS. 25(A) and 25(B)). FIG. 25(A) illustrates an input image having a low luminance value, and FIG. 25(B) illustrates an input image having a high luminance value. In this example, a standing person who waves the left hand is captured. In FIG. 25(B), the sky portion has a whiteout portion.

Second Comparative Example

Figure 25:
Figure 25:

A tone mapping process was performed on an entire HDR image generated from the two input images illustrated in FIG. 25. The results are illustrated in FIG. 26.

Second Practical Example

A tone mapping process was performed on the HDR image generated from the two input images illustrated in FIG. 25 with a whiteout region left as it was. The results are illustrated in FIG. 27.

Figure 26:
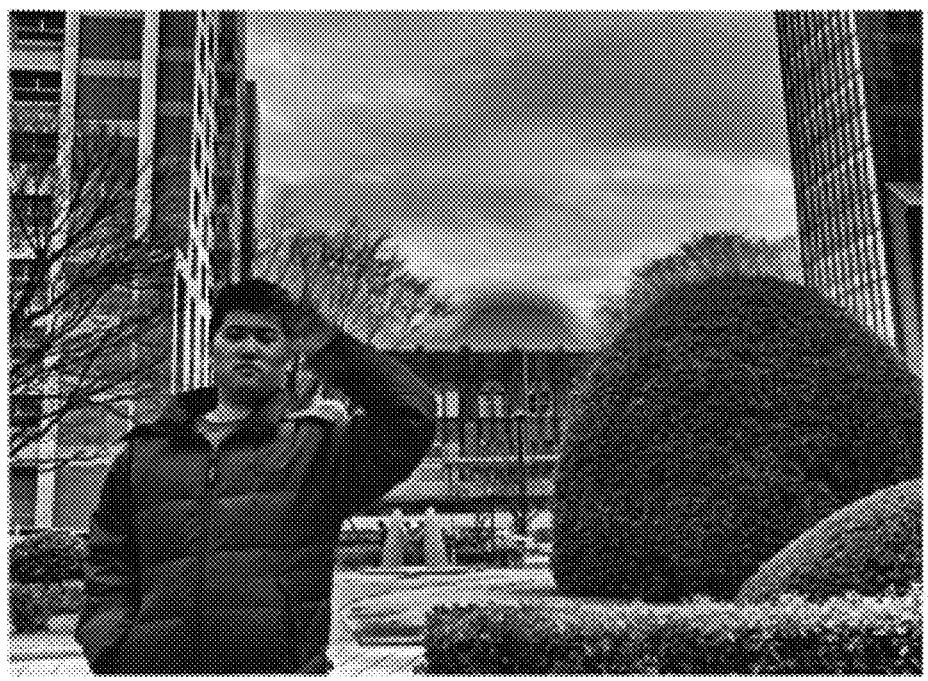
Figure 26:
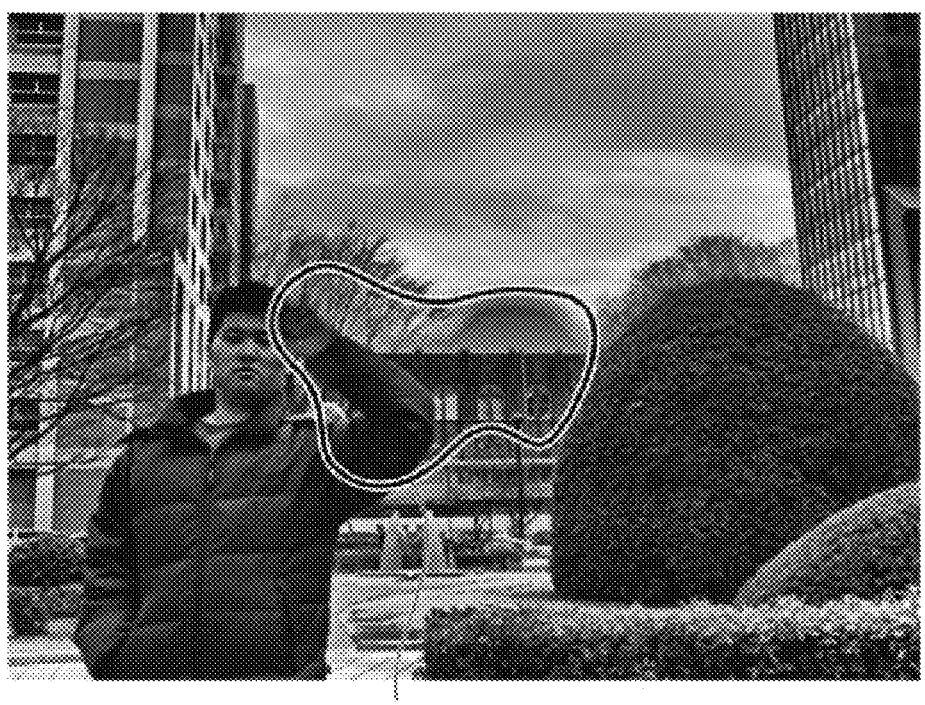
Figure 27:
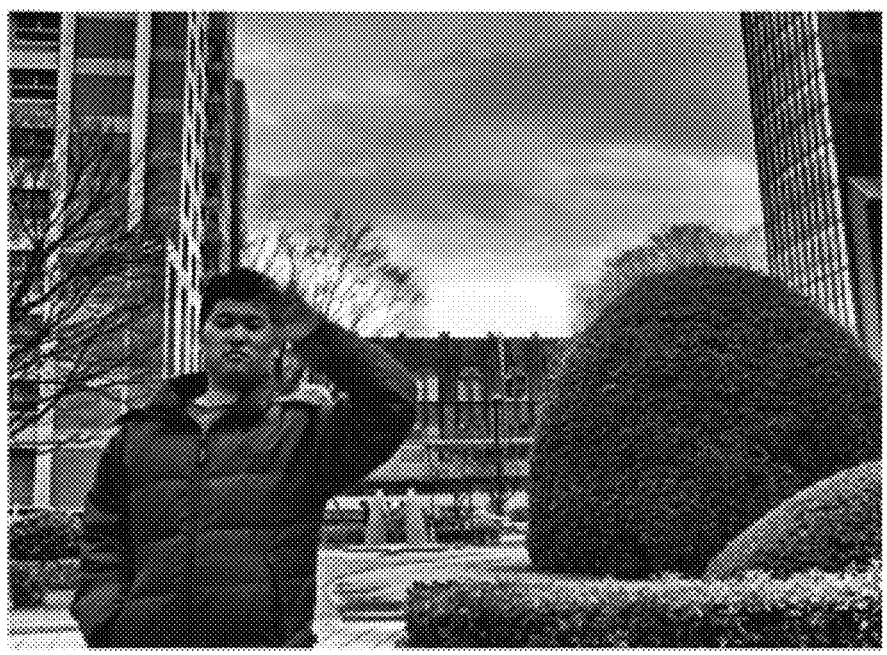
Figure 27:
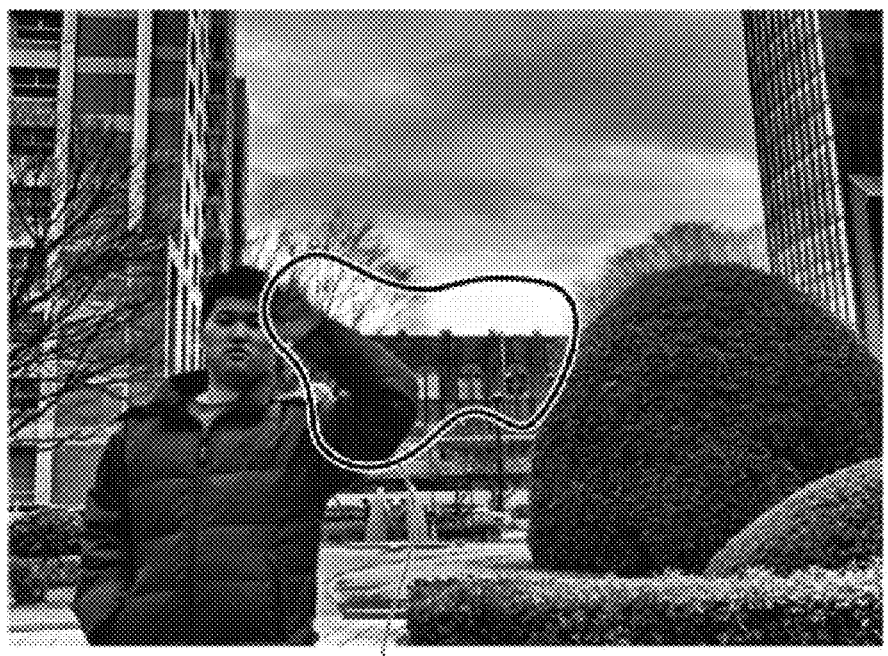

When FIG. 26 which illustrates the results of the second comparative example and FIG. 27 which illustrates the results of the second practical example, it was found that the second practical example 2 produced a high quality image in which the moving subject region Z2 is not noticeable as compared to the second comparative example.

REFERENCE SIGNS LIST

1: IMAGE PROCESSING UNIT, 10: IMAGE INPUT UNIT (INPUT UNIT), 12: MOTION INFORMATION ACQUIRING UNIT, 13: LIKELIHOOD CALCULATING UNIT, 14: EXPOSURE ESTIMATING UNIT, 15: MOTION CORRECTING UNIT, 16: MERGING UNIT, 50: DATA GENERATING UNIT, 51: RECORDING UNIT, 52: DATA ACQUIRING UNIT, 53: POST-PROCESSING UNIT

The invention claimed is:

1. An image processing device that performs image processing on a composite image obtained by merging a first image and a second image having different exposure conditions, the image processing device comprising:
   a data acquiring unit that acquires the composite image and region data indicating a target region of the composite image; and
   an image processing unit that performs different image processes between the target region and a region other than the target region based on the region data,
   wherein the first image and the second image comprise a moving subject region on which a moving subject is rendered,
   the composite image is generated by using a pixel value selected by using a first mask that selects pixel values having lower luminance values between the first image and the second image or a second mask that selects pixel values having higher luminance values between the first image and the second image in the moving subject region,
   the region data represents one or a plurality of regions generated based on the moving subject region of the composite image, as the target region, and
   in a case where the moving subject region is generated by using the first mask, the image processing unit performs a tone mapping process in which a luminance value is not increased to be equal to or greater than a first threshold value.

2. The image processing device according to claim 1, further comprising:
   an input unit that inputs the first image and the second image;
   a likelihood calculating unit that calculates a subject motion likelihood at each pixel based on a difference between the first image and the second image; and
   a region data generating unit that generates the region data based on the subject motion likelihood.

3. The image processing device according to claim 2, further comprising:
   an exposure estimating unit that estimates an exposure transform function for conforming the exposure conditions of the first image and the second image to each other based on the subject motion likelihood; and a merging unit that merges the first image and the second image by using the exposure transform function.

4. The image processing device according to claim 1, further comprising:
a recording unit that records the composite image and the region data so as to associate with each other.

5. The image processing device according to claim 1, wherein
the image processing unit performs different tone mapping processes between the target region and the region other than the target region.

6. The image processing device according to claim 1, wherein
the region data is data having a size smaller than a size of the first image, the second image, or the composite image.

7. The image processing device according to claim 1, wherein
in a case where the moving subject region is generated by using the second mask and includes a whiteout region, the image processing unit performs a tone mapping process in which a pixel value of the whiteout region approaches a pixel value of an original pixel or maintains a whiteout state of the white region.

8. The image processing device according to claim 1, wherein
the region data is further associated with original pixel information that specifies pixel information of an image used for creating the target region represented by the region data,
the data acquiring unit acquires the original pixel information associated with the region data, and
the image processing unit performs the different image processes between the target region and the region other than the target region based on the region data and the original pixel information.

9. An image processing method of performing image processing on a composite image obtained by merging a first image and a second image having different exposure conditions,
the image processing method comprising:
a data acquiring step of acquiring the composite image and region data indicating a target region of the composite image; and
an image processing step of performing different image processes between the target region and a region other than the target region based on the region data,
wherein the first image and the second image comprise a moving subject region on which a moving subject is rendered,
the composite image is generated by using a pixel value selected by using a first mask that selects pixel values having lower luminance values between the first image and the second image or a second mask that selects pixel values having higher luminance values between the first image and the second image in the moving subject region, and
in a case where the moving subject region is generated by using the first mask, the image processing unit performs a tone mapping process in which a luminance value is not increased to be equal to or greater than a first threshold value
the region data represents one or a plurality of regions generated based on the moving subject region of the composite image, as the target region.

10. A non-transitory recording medium that records an image processing program for causing a computer to perform image processing on a composite image obtained by merging a first image and a second image having different exposure conditions, the image processing program causing the computer to operate as:
a data acquiring unit that acquires the composite image and region data indicating a target region of the composite image; and
an image processing unit that performs different image processes between the target region and a region other than the target region based on the region data,
wherein the first image and the second image comprise a moving subject region on which a moving subject is rendered,
the composite image is generated by using a pixel value selected by using a first mask that selects pixel values having lower luminance values between the first image and the second image or a second mask that selects pixel values having higher luminance values between the first image and the second image in the moving subject region,
the region data represents one or a plurality of regions generated based on the moving subject region of the composite image, as the target region, and
in a case where the moving subject region is generated by using the first mask, the image processing unit performs a tone mapping process in which a luminance value is not increased to be equal to or greater than a first threshold value.

* * * * *